United States Patent [19] [11] Patent Number: 4,949,301
Joshi et al. [45] Date of Patent: Aug. 14, 1990

[54] IMPROVED POINTER FIFO CONTROLLER FOR CONVERTING A STANDARD RAM INTO A SIMULATED DUAL FIFO BY CONTROLLING THE RAM'S ADDRESS INPUTS

[75] Inventors: Sunil P. Joshi, Campbell; Venkatraman Iyer, Berkeley, both of Calif.

[73] Assignee: Advanced Micro Devices, Inc., Sunnyvale, Calif.

[21] Appl. No.: 836,936

[22] Filed: Mar. 6, 1986

[51] Int. Cl.[5] .................... G06F 12/00; G06F 12/06; G06F 12/08; G06F 12/10
[52] U.S. Cl. .................... 364/900; 364/926.1; 364/926.3; 364/926.9; 364/926.92; 364/927.81; 364/955; 364/957; 364/957.6; 364/959.1; 364/960; 364/960.2
[58] Field of Search ... 364/200 MS File, 900 MS File; 370/94

[56] References Cited

U.S. PATENT DOCUMENTS

| | | | |
|---|---|---|---|
| 3,676,846 | 7/1972 | Busch | 364/200 |
| 4,203,154 | 5/1980 | Lampson et al. | 364/200 X |
| 4,220,990 | 9/1980 | Alles | 364/200 |
| 4,334,287 | 6/1982 | Wiedenman et al. | 364/900 |
| 4,435,780 | 3/1984 | Herrington et al. | 364/900 |
| 4,482,956 | 11/1984 | Tallman | 364/200 X |
| 4,499,576 | 2/1985 | Fraser | 370/94 |
| 4,535,420 | 8/1985 | Fung | 364/900 |
| 4,569,041 | 2/1986 | Takeuchi et al. | 370/94 X |
| 4,590,468 | 5/1986 | Stieglitz | 370/94 X |
| 4,612,636 | 9/1986 | Grover et al. | 370/94 |
| 4,642,797 | 2/1987 | Hoberman | 364/900 X |

OTHER PUBLICATIONS

Signetics Bipolar LSI Division (Mar. 1981), FIFO RAM Controller, pp. 3–10.
S. Landry, "Printer Buffer Proves RAM-Based Logic's Strength and Versatility", (Nov. 14, 1985) Electronic Design, pp. 139–144.

*Primary Examiner*—Archie E. Williams, Jr.
*Assistant Examiner*—Robert B. Harrell
*Attorney, Agent, or Firm*—Ronald Fish; Mikio Ishimaru

[57] ABSTRACT

A RAM buffer controller for managing the address input lines of a RAM buffer to simulate the operation of two FIFO's therein. Apparatus is included for allowing random access by a node processor in a local area network node using the RAM buffer controller to manage "transmit and receive" FIFO's to have random access to any address in the address space of the buffer without restriction to FIFO boundaries. Apparatus is also included for transmitting packets from said buffer organized into one or two linked lists. Further, apparatus is included for allowing independent initialization of any of the pointers in the RAM buffer controller which are not currently selected, and for allowing software requests for read or write access by the node processor. Further, apparatus and a method are utilized for recording status and length information at the end of a packet instead of in front thereof and for allowing any incoming packet to be flushed without saving status information or to be flushed while saving its status information.

40 Claims, 11 Drawing Sheets

IMPROVED POINTER FIFO CONTROLLER FOR CONVERTING A STANDARD RAM INTO A SIMULATED DUAL FIFO BY CONTROLLING THE RAM'S ADDRESS INPUTS

BACKGROUND OF THE INVENTION

The invention relates to the field of high speed networking applications, and more particularly, to the field of RAM buffer controllers which control the address ports to random access memory to make the memory appear to be operating as two independent FIFOs.

There are three main application areas for high speed networking systems. The first is in back end networks where the network is used for interconnecting a variety of storage devices such as disks and tape drives with the host computers' backplane. Usually data transfers between disks and CPUs in such configurations call for extremely high throughput. A second application for high speed networks is high performance front end networks wherein a number of computers, terminals, and other devices are connected together by a single transmission medium over which messages are sent between the units on the network. A third application area is in backbone networks where lower speed networks are connected together by high speed networks that act as bridges between the low speed networks. High throughput capability is needed to prevent bottlenecks.

In such networks, a host system, which can be a computer, a terminal, a peripheral, or some other device, utilizes a specially adapted system for interface between the host system and the transmission media. Such systems normally include encoders and decoders for transforming the data into the proper signal format for transmission media and media access controllers for taking care of contentions for the media by different host systems. The host system is connected to a buffer memory by a RAM buffer controller and a data path controller. The purpose of the buffer memory is to store messages which are to be transmitted until such time as they are transmitted, and to store messages that have been received until such time as the host system is able to retrieve them from memory and process them. The data path controller controls the data inputs of the memory while the RAM buffer controller controls the address inputs of the memory.

In such systems, it is useful to have the buffer memory controlled in such a manner that it simulates the operation of a FIFO memory. This allows the host system to store messages to be transmitted in the buffer memory in a particular order, and allows the message to be transmitted in the same order. The same is true for received messages, i.e., the received message will be stored in buffer memory in a particular order and will be read out of the buffer by the host system in the same order.

There are existing FIFO RAM controllers which are available in the form of integrated circuits. One such circuit is the Signetics 8×60 which manages the address pins of standard off-the-shelf RAMs in such a manner that the RAMs implement a high speed/high capacity FIFO stack. Another such system is the Xilinx Inc. logic cell array in the form of a printer buffer controller model no. XC2064, described in *Electronic Design* of Nov. 14, 1985 at page 139. Both of these RAM controllers cause standard off-the-shelf RAM to implement a single FIFO buffer.

Unfortunately, neither of these systems has sufficient flexibility and performance in terms of architectural capability to support a complex high speed network application. For example, neither system can cause a single bank of memory to implement two independently operating FIFOs. Further, prior art FIFO RAM controllers generally use counters to keep track of the read and write pointer locations. Such counters cannot generally be initialized to random, desired addresses when any of the other counters are in use in controlling the address applied to the address pins of the controlled memory. The ability to independently set any pointer in the system while another pointer is being used to control the address pins is a useful feature in that it provides great flexibility to the system software designers.

Further, such prior art systems do not generally support random access to any location in memory which access is not constrained by FIFO address limitations. It is useful in implementing various control functions to have a random access capability such that the contents of any address in the memory can be read or changed regardless of whether it is outside currently established FIFO starting or ending addresses.

Another shortcoming of the prior art FIFO controllers is in the area of flushing packets or data which has arrived but which has proven to be not desirable for retention in the memory. Such data may be data which is not addressed to the host system or which may have a transmission error destroying the integrity of the data. The prior art systems do not provide circuitry which allows flushing of data in simple and expeditious fashion.

It is also useful when managing a FIFO to be able to record status and length information associated with each packet in a memory location adjacent to the location as opposed to storing it at the end of the packet. The best location for such status and length information is in the memory location just preceding the first byte of the packet data. Unfortunately the prior art systems do not provide circuitry which adequately supports the ability to simply and quickly write status and length information in the memory location just preceding the first byte of the received packet data.

It is also useful when managing a FIFO to be able to abort a particular packet for some reason without losing its status and length information. The prior art systems do not provide circuitry which easily supports such a control function.

In some networking applications such as token ring networks, it is desirable to be able to transmit data bytes, words, or packets in linked list format, i.e., where the bytes, words, packets to be transmitted are not stored in contiguous locations in memory but instead are spread throughout the memory. Such a linked list has a pointer at the end of each member of the list which points to the starting address for the next member of the list. The prior art systems do not have circuitry which allows linked lists of data to be transmitted. Typically such prior art systems use counters which are incremented by a clock such that the pointers for transmission of data very continuously from one memory location to the next memory location in contiguous fashion. Such an architecture cannot be easily adapted to linked list transmission.

It is very useful in management of FIFOs to be able to establish flexible starting and ending addresses for the FIFO. The registers which are used to store such starting addresses and ending addresses are not used in linked list transmission. This is because linked list transmission is not a FIFO operation so starting and ending addresses are meaningless. However, during linked list transmission there sometimes arises a need to save the current read address pointer in the middle of transmitting a particular linked list and change the read address pointer to a fixed predetermined address to begin transmitting a particular packet which starts at that address. Such a situation typically arises when, in a token ring situation, a ring recovery packet must be transmitted because of a problem on the network. It is useful to be able to utilize the memory locations which store the starting address and ending address for FIFO operations as new link and save registers for use in vectoring transmission to the starting address of the recovery packet and for saving the current contents of the read pointer.

Finally, it is also useful to be able to send packets in back-to-back fashion with virtually no time between the end of transmission of a first packet and the beginning of transmission of a second packet. Sometimes in FIFO management by a FIFO controller, there are simultaneous access requests by various units in the network interface. For example, the host system may request access to the memory for purposes for storing therein a packet to be transmitted. For such a transaction, the FIFO controller must provide the memory with a write pointer to provide an address into which the first byte of data from the host system will be written. Simultaneously, a packet of data addressed to the host system may be arriving from another system on the network. Such a packet must be stored in the memory as it arrives. In the prior art systems where two FIFO buffers cannot be simultaneously managed, such a situation can never occur, and if it does occur, an error condition will exist. However in systems where such a situation can occur, it will be necessary to arbitrate the simultaneous requests to determine the then current highest priority request. Then, it is useful to have the arbitration occur in a pipelined fashion such that the arbitration is occurring simultaneously with service of thr prior request. That is, it is useful to be able to arbitrate a first group of requests and then service the winning request simultaneously with concurrent arbitration with a second group of requests such that upon completion of the service of the winning request from the first arbitration, the service of the winning request from the second arbitration may begin immediately.

Thus a need has arisen for a flexible system for managing external memory so as to provide simultaneous independent FIFO implementation and to satisfy all the above noted needs.

SUMMARY OF THE INVENTION

The invention provides a system which can manage the address inputs of a memory such that two independent FIFO buffers can be maintained or, alternatively, a receive FIFO may be implemented while a linked list is implemented for transmission of data. In the preferred embodiment, the invention can support linked list transmission of two or more independent linked lists. In one embodiment, the invention is comprised of a first means for storing a plurality of pointer addresses. An output multiplexer is coupled to the first such means to select one of the pointer addresses for output to the address pins of the memory. An incrementing circuit coupled to the output of the output multiplexer increments the selected pointer address and supplies it on a bus which is coupled into the inputs of the first means such that the selected pointer can be incremented for the next memory access. In the preferred embodiment, the plurality of addresses are stored in a plurality of registers. Each register has an input multiplexer for controlling which one of several inputs is selected for coupling into the data input of the register associated with the particular input multiplexer. In one embodiment, there is a write address pointer register and a read address pointer register for a transmit FIFO and a write address pointer and a read address pointer for a receive FIFO. In the preferred embodiment, one input of each input multiplexer is coupled to an initialization bus and another input of each multiplexer is coupled to the output of the incrementing circuit. Thus, the particular pointer which is selected has its input multiplexer switched such that the output of the incrementing circuit is applied to the inputs of the selected pointer and the selected register output is coupled through the output multiplexer to the address pins of the memory. Any other pointer storage register may then be accessed through the initialization bus and the appropriate input multiplexer such that the contents of that register may be initialized to any desired pointer address.

In another embodiment of the invention, a random access memory pointer storage register is provided. It also has an input multiplexer which has one input coupled to the initialization bus and another input coupled to the output incrementing circuit.

All of the pointer storage registers in all of the embodiments of the invention have one input of their input multiplexers coupled to the output of the associated register. This allows the contents of the pointer register to be maintained at its current value without incrementation as long as the input multiplexer is selecting the input coupled to the register output. This provides maximum flexibility in dealing with external memory since the pointer register contents may be held constant for long periods of time thereby eliminating any timing difficulties which may arise from differing operational speeds of the memory and circuitry which is accessing the memory and allowing pipelined requests arbitration as will be described below. The random access memory pointer storage register also shares this capability with the other pointer storage registers.

There is for each of the transmit and receive FIFOs an end address storage register. Both such registers have input multiplexers one input of which is coupled to the initialization bus. This allows the end addresses of the FIFOs to be changed at will. The outputs of the end address registers are switched through an output multiplexer to one input of a comparator, the other input of which is coupled to the output of the output multiplexer coupled to the pointer storage registers. The selected pointer address is constantly compared by the comparator against the appropriate end address for purposes of determining whether the FIFO end boundary has been reached by the currently selected pointer. Control logic coupled to the output multiplexer and input multiplexers insures that the proper end address pointer register is selected for comparison at any particular time based on the currently selected pointer. The output of the comparator goes to the control logic which causes the starting address for the appropriate FIFO to be loaded into the selected pointer when the selected pointer has been incremented to equal the end address. The starting addresses are stored in registers which also have input multiplexers one input of which is coupled to the initializaiton bus. Thus the starting addresses may be randomly set to any desired address.

The output of the comparator for the end address circuitry is ignored by the control logic when the control logic has selected the random access pointer for output to the address pins of the memory. Thus the random access circuitry of the invention is not subject to any FIFO end address limitations.

Another embodiment of the invention utilizes a shadow write pointer storage register. This register also has an input multiplexer one input of which is coupled to the output of the write pointer storage register for the receive FIFO. Another input of the input multiplexer for the shadow write pointer storage register is coupled to the output of the shadow write pointer register itself. Also one output of the shadow write pointer storage register is coupled to one input of the input multiplexer for the write pointer storage register for the receive FIFO.

The control logic is designed to implement three separate algorithms. They are, respectively: One, an algorithm for reception of normal data packets; two, an algorithm for totally flushing undesired packets; three, an algorithm for aborting received packets without losing the status and length information which is recorded by the algorithm for storing normal received packets.

The algorithm for storing normally received packets allows status and length information to be written in the memory location just preceding the fist byte of the received packet. This is true regardless of how long the packet is and whether or not its length is known. This is accomplished by storing the address contents of the write pointer for the receive FIFO in the shadow write pointer register at the beginning of packet reception and skipping the first address location. Packet data is then stored beginning at the newly incremented address stored in the write pointer for the receive FIFO. At the end of packet reception, the address contents of the shadow write pointer register are restored into the write pointer register for the receive FIFO and vice versa and status and length information is written into the location then pointed to by the write pointer. After the status and length information is written, the write pointer register for the receive FIFO is restored to the address just following the last byte of data in the received packet by causing the input multiplexers for the write pointer register for the receive FIFO and the shadow write pointer register to select inputs such that the contents of the shadow write pointer register are restored in the write pointer register for the receive FIFO.

The control logic for the invention is designed also to allow simple and expeditious flushing of undesired packets by causing the contents of the write pointer register for the receive FIFO to be stored in the shadow write pointer register at the beginning of reception of each packet. When a packet is to be flushed, a signal indicates this event to the control logic which then causes the contents of the shadow write pointer register to be stored in the write pointer register for the receive FIFO, thereby restoring the write pointer to the address value marking the beginning of the current packet to be flushed. The control logic for the invention implementation implements the abort algorithm in a similar fashion to the flush algorithm but with some slight variations.

Another embodiment of the invention utilizes a connection of a data bus to an input for the read pointer storage register for the transmit FIFO. When it is desired to transmit linked lists, the control logic causes the input multiplexer for the read pointer for the transmit FIFO to select the input coupled to the data bus. In this manner, the linking address for the next element on the linked list may be loaded into the read pointer for the transmit FIFO such that memory access may be had to the next element on the list through use of this pointer. The control logic causes the output multiplexer to select the read pointer for the transmit FIFO as the output address in such situations.

In another embodiment, an additional read pointer for transmission is provided in the form of another read pointer storage register. This additional register also has an input multiplexer which has one input coupled to the data bus such that two independent linked lists may be transmitted using the two read pointers for transmit operations alternatively or by selecting one pointer for transmission of a first linked list and selecting the second pointer for transmission of the second list after completion of transmission of the first list.

During transmission of linked lists, it sometimes happens that a ring recovery condition will be necessary, and a predetermined packet located at a known location in memory must be transmitted to aid in ring recovery. In such an event, the current contents of the read pointer for the transmit buffer must be saved and a new read pointer for the transmit buffer must be loaded. The new pointer is the address of the fixed packet to be transmitted. The invention advantageously uses the storage register for the end address for the transmit buffer for storage of the current read pointer for the transmit buffer. This saving of the current read pointer for the transmit buffer is accomplished through a pathway from the output of the read pointer storage register for the transmit buffer to one input of the input multiplexer for the end address storage register for the transmit buffer. In ring recovery situations, the control logic causes this aforementioned pathway to be selected at the input multiplexer for the end address storage register for the transmit buffer. Simultaneously, the input multiplexer for the read pointer for the transmit buffer is caused to select the output of the starting address pointer storage register to load the new link address. The new link address, i.e., the address of the beginning of the recovery packet, has been previously loaded into the starting address storage register during linked list operations through the initialization bus.

In the preferred embodiment, multiple clock cycles are used for each memory access. During one clock cycle of the memory access, the selected pointer is incremented via the incrementing circuit. During clock cycles following incrementation, the selected pointer is caused by the control logic to be maintained at a constant value by causing the input multiplexer to select its input which is coupled to the output of the selected pointer storage register. Thus the pointer can be held at a constant value for as many clock cycles as are needed to complete the transfer. The control logic also simultaneously causes the arbitration logic which is connected to the pointer memory access request lines from the various requesting units to arbitrate the requests during the service cycle or cycles for the winning request from the previous arbitration. In the preferred embodiment, each read or write transfer to the memory is designed as a two clock cycle transfer. During the second clock cycle of the service, the winning request from the first arbitration, the arbitration for the second group of requests, is completed. Thus the winning request for memory access will have been determined by the arbitration circuitry by the completion of the service cycle for the winning request from the previous arbitration. Thus, packets may be transferred in back-to-back fashion without the need for waiting for arbitrations to be completed between packets.

DETAILED DESCRIPTION OF THE PREFERRED EMBODIMENT

Figure 1:
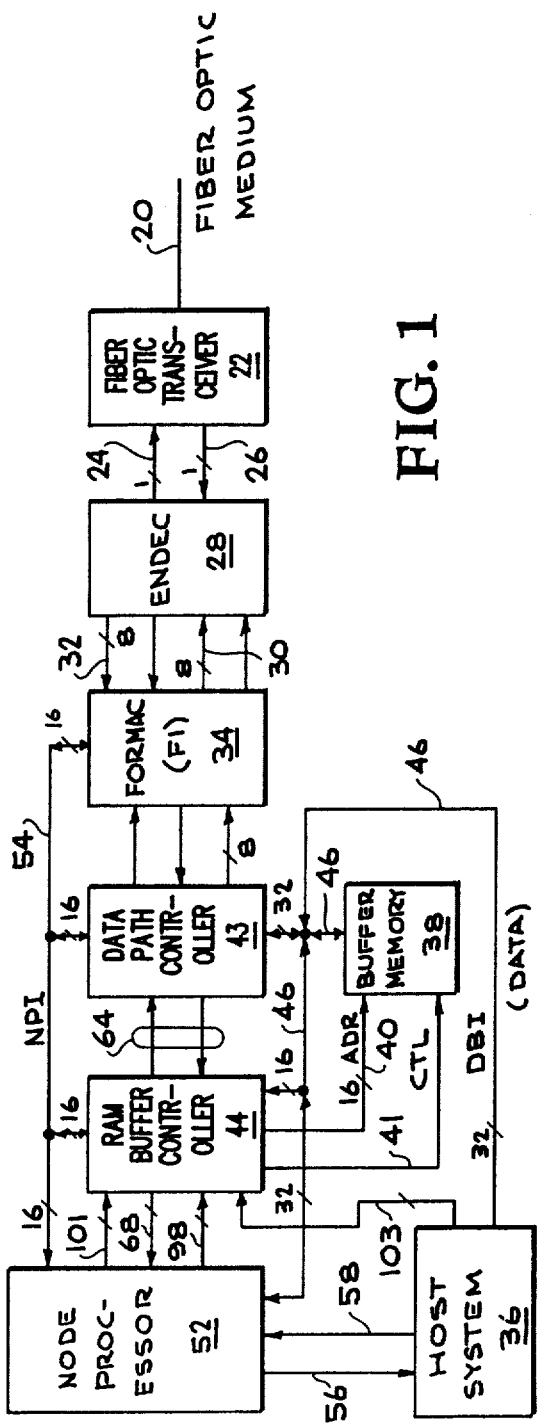
FIG. 1 is a block diagram of a typical system in which the invention might be found.

Referring to FIG. 1, there is shown a block diagram of a typical system in which the RAM buffer controller of the invention resides. A transmission medium such as a fiber optic cable 20 is used to carry data between systems connected to the medium. A transceiver 22 converts signals on the medium 20 to electrical signals in serial format, and vice versa. Signals to be transmitted on the medium 20 are sent to the transceiver 22 on a bus 24, while signals arriving from the medium are converted to electrical signals of the proper format and output from the transceiver on a bus 26. An encoder/decoder 28 encodes data for transmission arriving on a bus 30 into the proper code selected for transmission on the medium 20. Data arriving from the medium 20 is decoded in the encoder/decoder 28 and output on a bus 32.

Every local area network has a protocol. Further, every network has a topology, such as star, ring, or other topologies which may be developed in the future. To provide the flexibility in architecture to accommodate all such differences in topology and protocol, the protocol or topology-specific functions are implemented in the media access controller circuit (FORMAC) 34. The design of the media access controller, encoder/decoder, and transceiver are known for the various topologies and protocols which today exist. Further, they are not critical to the invention, since the RAM buffer controller of the invention is designed for use in any topology and any protocol with any type of medium. Thus, for a particular type of topology and protocol, a particular design for the media access controller will be selected. The same is true for the transceiver and for the encoder/decoder.

All the circuitry of FIG. 1 is designed to service the communications needs of a host system 36. This host system may be any one of a number of different types of logic systems, such as a computer, disk drive, personal computer, work station, or other peripheral. This host system may be big or small, and it may be fast or slow.

The host system 36 has a need to transmit data packets to the other host systems on the network and to receive data packets therefrom. Because the host system may be busy doing other tasks when a receive packet arrives on the medium 20 addressed to the host system 36, it is necessary to temporarily store the received packet until the host system 36 has the opportunity to process it. Likewise, the host system 36 has a need from time to time to transmit packets to other host systems on the network. However, the network can accommodate only one pair of transmitting and receiving host systems at any particular time. Therefore, when the host system 36 wishes to transmit a packet, it is sometimes found that its access to the medium 20 is blocked by virtue of another pair of host systems' having exclusive control of the medium 20. Therefore, it is sometimes necessary to temporarily store the packet to be transmitted in a buffer memory until such time as the medium 20 is granted to the host system 36. The temporary storage functions mentioned herein are performed by a buffer memory 38. This buffer memory has an address port connected to an address bus 40 for receiving addresses which control the particular location in the buffer memory 38 for which data is retrieved or to which data is written. Data retrieved or data to be written is transmitted on or received over a data bus 46.

A data path controller 43 is coupled to the buffer memory 38 via the data bus 46 and serves to control the data transmission to and from the buffer memory 38 on the data bus. The RAM buffer controller of the invention is symbolized by the block 44, which is coupled to the buffer memory 38 by the address bus 40. The purpose of the RAM buffer controller is to arbitrate requests for access to the buffer memory 38 by the various elements in the system of FIG. 1, select one request to be honored, and to output an address pointer to the buffer memory 38 on the address bus 40 to cause the buffer memory 38 to output data from or store data in the proper address. The RAM buffer controller of the invention maintains a set of pointer addresses stored in registers therein which can cause the buffer memory 38 to simulate the operation of two independently operating buffer memories. In the preferred embodiment, these two simulated buffers are FIFO organized, but in other embodiments, such as embodiments outside the local area network field where the RAM buffer controller is being used for stack operations, these two buffers may be FIFO organized such that the read and write pointers are managed or otherwise controlled such that a last in, first out operation is performed.

The host system 36 can send data to the buffer memory 38 or receive data from the buffer memory 38 on a data bus 46. This data bus 46 is also connected to a data input of the RAM buffer controller. Further, the data bus 46 is connected to a data port of a node processor.

The node processor 52 is a typically a microprogrammed or conventional microprocessor-based system used for overseeing the operation of the RAM buffer controller 44, the data path controller 43, and the media access controller 34. The node processor is coupled to these three units by an NPI bus 54. The main function of the node processor is to initialize the contents of various registers in the RAM buffer controller 44 and to initialize the data path controller and the media access controller 43 and 34, respectively. The node processor also responds to various system level and packet level interrupts. In simple systems the node processor may be the minimum state machine required for the system requirememts. In complicated systems, the node processor may be a sophisticated enough machine to execute all the higher level protocols in the 7 layer ISO model. The node processor does its work with the RAM buffer controller and the other units of the system using the NPI bus 54 and various bus handshake and instruction lines. The other lines in FIG. 1 which have not been discussed so far are control and handshake signals which are interchanged between the units to control the direction of data transfer on the various buses, acknowledge the receipt of certain signals, signal the occurrence of various events, and otherwise control the operation of the system. The particular control signals which are relevant to the invention will be discussed later herein, as the need arises. The control lines 56 and 58 between the node processor and the host system implement a handshake which is user dependent and depends upon partitioning functions between the host and the node processor. For instance, in large systems the host may have a powerful and complex node processor 52 which is used for off loading various networking-specific chores.

The node processor can talk to the buffer memory 38 by making a node processor service request on the control bus 101 to the RAM buffer controller and transmitting data to or receiving data from the buffer memory 38 on the data bus 46. A typical node processor would usually consist of a microprocessor with assorted peripheral chips for performing DMA, interrupts, etc. It would also have some local memory, and it would treat the RAM buffer controller and the data path controller as peripherals for networking functions. The node processor receives status information from the RAM buffer controller, the data path controller, the media access controller, and the buffer memory 38. The node processor therefore has complete control over and knowledge of the state of these units.

The node processor runs either synchronously or asynchronously with respect to the network clock. The network clock is derived from the incoming data by the transceiver 22. That is, the transceiver interfaces to the medium and derives clocking information from the encoded data stream and passes this clocking signal on to the media access controller. The media access controller then typically converts the serial data stream to 8-bit parallel data for output on the bus 32. The data path controller 43 then converts the 8-bit parallel data from the media access controller and encoder/decoder to 32-bit parallel data for transmission on the data bus 46.

Figure 2:
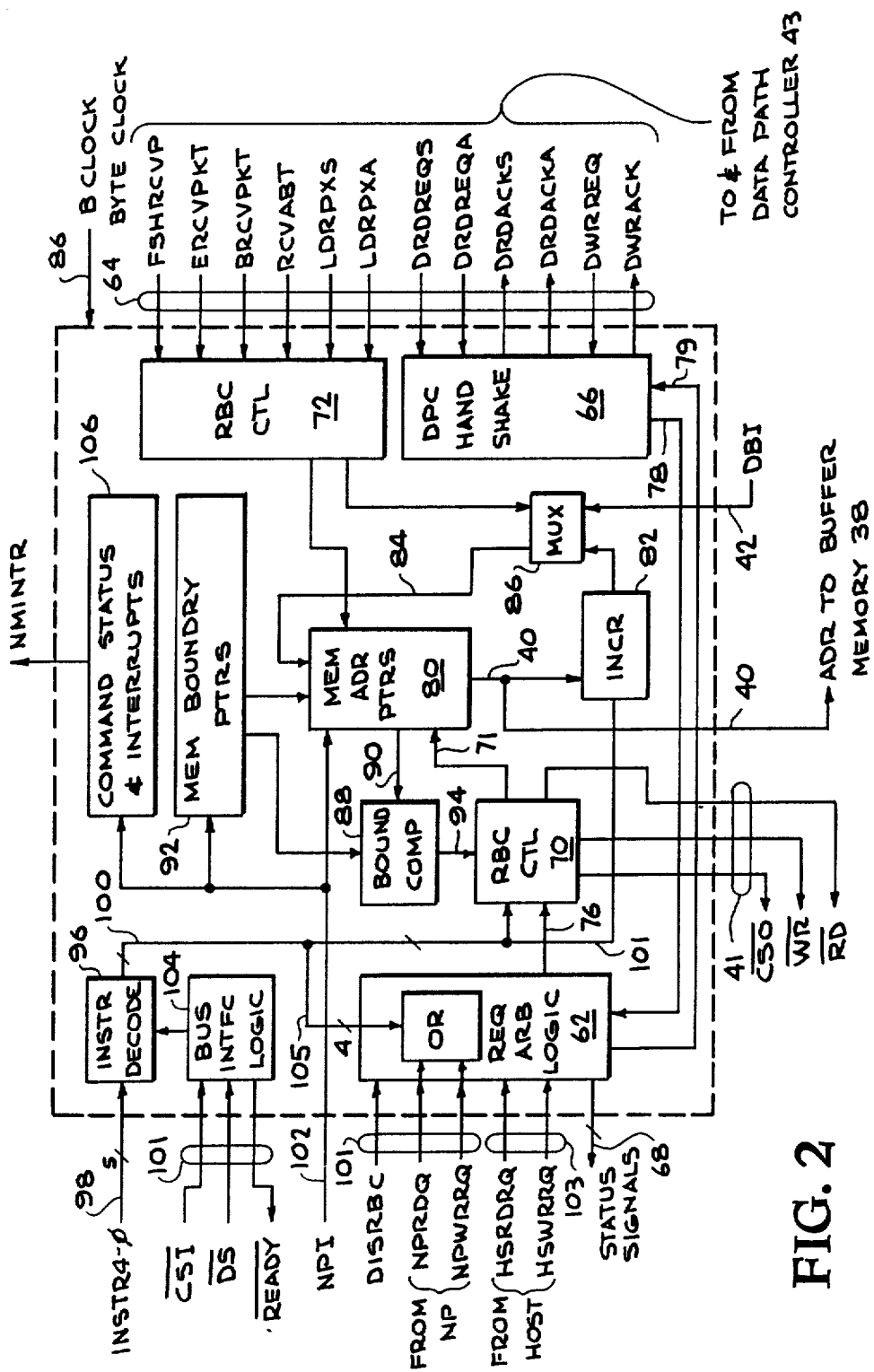
FIG. 2 is a block diagram of the RAM buffer controller of the invention.

Referring to FIG. 2, there is shown a more detailed block diagram for the RAM buffer controller 44. The RAM buffer controller (hereafter RBC) includes request arbitration logic 62, which serves to arbitrate requests from the node processor, the data path controller (sometimes hereafter referred to as the DPC) and the host system for access by way of a DMA transfer to or from the buffer memory 38. DPC requests for access to the memory are made using handshake signals directly exchanged between the RBC and DPC on the bus 64 in FIG. 1. These access requests by the DPC are routed by the handshake logic on line 78 to the request arbitration logic which arbitrates the requests and acknowledges them on line 79. The acknowledge signals sent back to the DPC on bus 64 in response to the acknowledge signals on line 79 will be discussed later. The handskake with the DPC is performed by DPC handshake logic 66 in FIG. 2.

Each of the node processor, host system, and DPC can request either a read access or a write access to the buffer memory 38. The signal NPRDQ to the arbitration logic 62 represents a node processor read request, while the signal NPWRRQ represents a node processor write request. There is an acknowledge signal on the status signal bus 68 for the reception of each of the aforementioned signals. The signal HSRDRQ represents a host system read request, and the signal HSWRRQ represents a host system write request. Again, each of the host system service requests has an acknowledge signal on the status signal bus 68. The DPC handshake logic 66 receives the signal DRDREQS and DRDREQA. These signals represent, respectively, a read request synchronous and a read request asynchronous from the DPC. The signals DRDACKS and DRDACKA, respectively, represent the acknowledge signals for the aforementioned DPC read request signals. The signal DWRREQ represents a data path controller write request, and the signal DWRACK represents the acknowledge signal for that write request.

There is an RBC control logic collection of circuitry which is represented by the blocks 70, 72, 66 and 96 in FIG. 2. This control logic in later figures will be collectively referred to as control logic 125. The RBC control logic component 70 and the RBC control logic component 72 serve to control the various multiplexers in the system (not shown in FIG. 2) based on the particular mode in which the RBC is operating at any particular time. The mode that the machine is operating in is determined by the state of the control signals entering the system from all sources. The RBC control logic 70 also generates control signals which are transmitted to the buffer memory 38 on the bus 41. These control signals consist of the signals CSO NOT, WR NOT, and RD NOT. The signal CSO NOT is a chip select signal which is sent to the buffer memory 38 to select that chip, thereby causing its address and data ports to become active. This signal is low at any time that a read or write memory operation is taking place. The signal WR NOT tell the buffer memory that the data at its data input port coupled to the data bus 42 should be stored in the address then existing on the address bus 40. The signal RD NOT tells the buffer memory 38 to retrieve the data stored at the address then existing on the address bus 40 and output it onto the data bus 42.

The addresses to the buffer memory 38 are stored in a plurality of registers symbolized by the memory address pointer block 80 in FIG. 2. Depending on which access request is currently selected for service, one of these pointers is selected for output on the address bus 40. This current address is then incremented by the incrementer block 82 and fed back to the input of the pointer register selected via the bus 84. Thus, as long as that pointer register is selected, its contents will be continuously incremented according to a service request pattern established by the RBC control logic in synchronization with a byte clock signal BCLOCK on a line 86A.

In certain modes of operation, specifically, the linked list mode, it is necessary to input address data into certain of the registers of the RBC as pointers to the next item on the list. This address information is input on the data bus DBI 42. In this mode of operation, the RBC control logic causes a multiplexer 86 to select the DBI bus 42 such that its address data can be loaded into the proper registers. The multiplexer 86 symbolically represents a collection of input multiplexers which will be defined more specifically in later drawings herein.

A boundary comparator 88 compares the value of the currently selected pointer on bus 90 against the end address pointers stored in the memory boundary pointer registers 92, and generates a control signal on a line 94 coupled to the RBC control logic 70 to indicate when the currently selected pointer has reached the end address of the particular FIFO of interest.

An instruction decoder 96 decodes instructions received on an instruction bus 98 from the node processor and generates control signals on the bus 100 coupled to the RBC control logic 70 and the incrementer 82 to cause the proper events to occur to carry out an instruction. Table I below is a listing of the instructions in the RAM buffer controller instruction set and indicates what each instruction does. An NPI initialization bus 102 from the node processor carries initial address values established by the node processor for the starting and ending addresses of the receive and transmit FIFO buffers in the buffer memory 38. It also carries initial address values which can be loaded into most of the pointer registers in the RAM buffer controller. Bus interface logic 104 receives a chip select signal CSI NOT (active low as are all signals where the signal name is followed by NOT) from the node processor indicating the RAM buffer controller is selected for an operation. Another interface signal DS NOT is active low when data on the NPI bus 102 is synchronous to the byte clock signal BCLOCK on the line 86. In such a case, the DS NOT signal behaves much like a data strobe on slave devices connected to a standard microprocessor. There is a signal INSTRA4 in the instruction bus 98 which serves to signal whether a read or write transaction of the registers in the RAM buffer controller is requested. Each register in the RAM buffer controller can be read through a multiplexer not shown in FIG. 2. When the signal INSTR4 and CSI NOT are low, a write operation is in progress from the node processor to the RAM buffer controller on the NPI bus 102, and the signal DS NOT should become active whenever the data to be written is valid. The DS NOT signal should stay active and the data on the NPI bus should remain valid until the RAM buffer controller forces the signal READY NOT to go low. In case of a read operation, when INST4 is high and CSI NOT is low, the node processor makes the signal DS NOT go low whenever it is ready to accept the read data. When the signal CSI NOT is high, the signals on the bus 98 are ignored, and the NPI bus 102 is kept in the three-state mode.

TABLE I

Instruction Set

| INST | Decimal value | Inst. mnemonic | Inst. function |
|---|---|---|---|
| 43210 | | | |
| 00000 | 0 | IRESET | Software Reset |
| 00001 | 1 | ILDRPXS | Load Synchronous RPX |
| 00010 | 2 | ILDRPXA | Load Asynchronous RPX |
| 00011 | 3 | ILDRPR | Load RPR |
| 00100 | 4 | ILDMAR | Load MAR |
| 00101 | 5 | ILDWPX | Load WPX |
| 00110 | 6 | ILDWPR | Load WPR |
| 00111 | 7 | ILDSAX | Load SAX |
| 01000 | 8 | ILDSAR | Load SAR |
| 01001 | 9 | ILDEAX | Load EAX |
| 01010 | 10 | ILDEAR | Load EAR |
| 01011 | 11 | ILDCMD | Load Command |
| 01100 | 12 | INPRDNI | Node processor read request, no increment |
| 01101 | 13 | INPWRNI | Node processor write request, no increment |
| 01110 | 14 | INPRDWI | Node processor read request with increment |
| 01111 | 15 | ICLDSTS | Clear Dynamic Status |
| 10000 | 16 | INPWRWI | Node processor write request with increment |
| 10001 | 17 | IRDRPXS | Read Synchronous RPX |
| 10010 | 18 | IRDRPXA | Read Asynchronous RPX |
| 10011 | 19 | IRDRPR | Read RPR |
| 10100 | 20 | IRDMAR | Read MAR |
| 10101 | 21 | IRDWPX | Read WPX |
| 10110 | 22 | IRDWPR | Read WPR |
| 10111 | 23 | IRDSAX | Read SAX |
| 11000 | 24 | IRDSAR | Read SAR |
| 11001 | 25 | IRDEAX | Read EAX |
| 11010 | 26 | IRDEAR | Read EAR |
| 11011 | 27 | IRDCMD | Read Command |
| 11100 | 28 | IRSV4 | Reserved |
| 11101 | 29 | IRSV5 | Reserved |
| 11110 | 30 | IRDSTAT | Read Status |
| 11111 | 31 | IRDDSTS | Read Dynamic Status |

A command and status interrupt logic 106 generates the nonmaskable interrupt signal NMINTR NOT. This signal is used for interrupting the node processor when a fatal error sets the status bit in the RBC.

Figure 3:
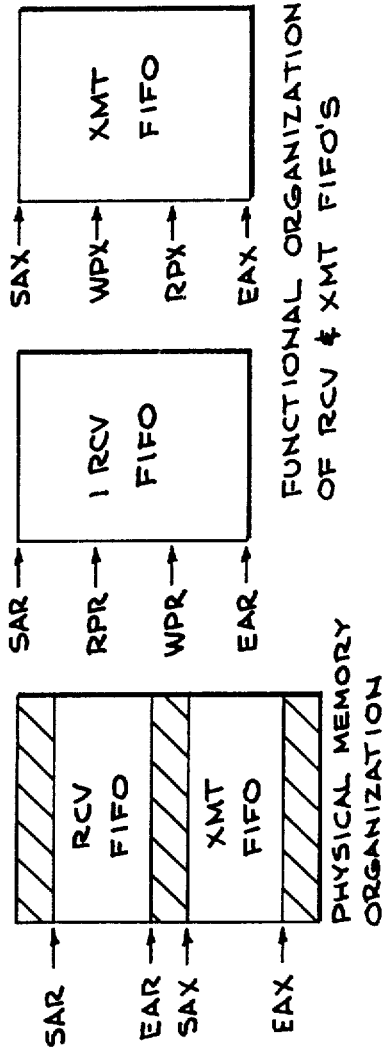
FIG. 3 is a diagram of the physical and logical organization of the two FIFO buffers managed by the RAM buffer controller.

Referring to FIG. 3, there are shown both a physical and logical organization diagram of the receive and transmit FIFOs contained within the buffer memory 38. On the left is the physical memory organization. Two pointers, SAR and EAR, define the starting and ending addresses, respectively, of the receive FIFO. Another nonoverlapping block of memory is used for the transmit FIFO, which has its starting address defined by the pointer SAX and its ending address defined by the pointer EAX. On the right in FIG. 3 is the functional organization of these two receive and transmit FIFOs. For the receive FIFO, there is a read pointer, RPR, which defines the current location for read operations by any requesting unit. There is also a write pointer, WPR, which defines the current address location for any write operations in the receive FIFO. For the transmit FIFO, the write pointer, WPX, defines the current location for any write operations. Likewise, the read points, RPX, defines the current location for any read operations from the transmit FIFO. For the receive FIFO, write operations correspond to data arriving on the medium 20, which is then written into the buffer memory 38. Read operations for the receive FIFO correspond to accesses by the node processor or the host system to retrieve the data from the buffer memory that has arrived on the medium 20. For the transmit FIFO, write operations correspond to the host system, or possibly the node processor, writing data into the buffer memory 38 for later transmission on the medium 20. Read operations on the transmit FIFO correspond to the process of taking data to be transmitted out of the buffer memory 38 and converting it to the proper code to be transmitted on the medium 20.

Figure 4:
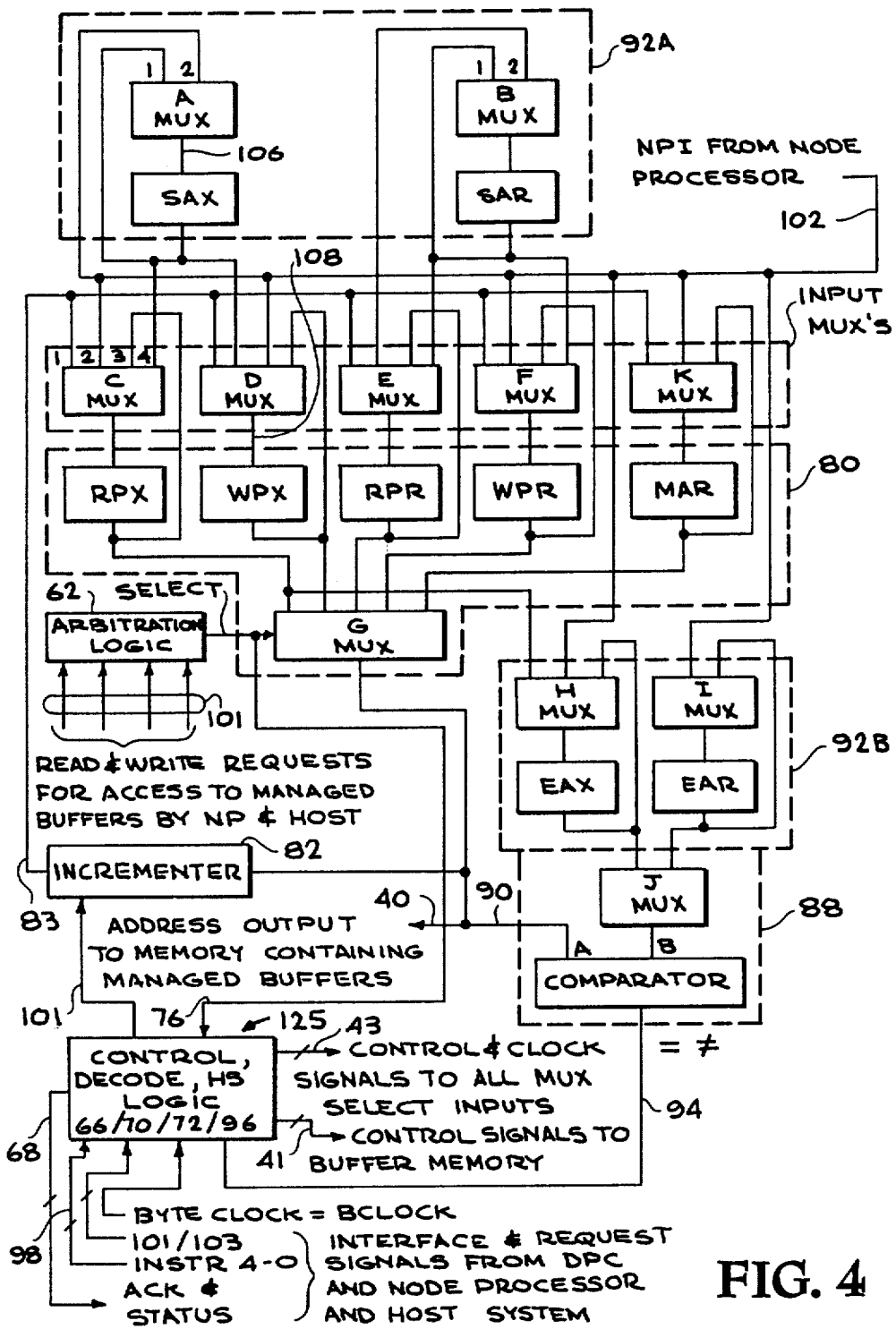
FIG. 4 is a more detailed block diagram of one embodiment of the invention.

Referring to FIG. 4, there is shown a more detailed block diagram of one embodiment of the RAM buffer controller of the invention. For purposes of clarity of explanation, a general description of the operation of the circuitry of FIG. 4 will be given, without reference to timing details at this point, to enable the reader to grasp the general operation of the system. More details will be given later on the operation of the system in connection with the description of timing diagrams detailing various modes of operation.

To transmit a packet, the host system must write the packet to be transmitted into the buffer memory 38 in FIG. 1. To do this, the buffer memory 38 must be supplied with an address or addresses in the transmit FIFO in which the data is to be stored. To initiate this process, the host system will assert the signal HSWRRQ in FIG. 2 to the request arbitration logic 62. There may be other service requests pending at the time that the aforementioned service request by the host system is made. It is the job of the arbitration logic to select the highest priority currently pending request for service. The priority of service requests is that DPC requests have the highest priority, followed in order by node processor requests and host system requests.

When the host system write request is selected for service by the arbitration logic 62, the arbitration logic transmits a select signal to a G multiplexer having inputs coupled to the outputs of the pointer storage registers in the RAM buffer controller indicating that the write pointer for the transmit buffer, WPX, is to be selected for output. This causes the output of the WPX pointer storage register to be coupled to the address bus 40 by the G multiplexer. Prior to this time, the node processor will have issued a number of instructions on the instruction bus 98 to cause loading of the starting and ending addresses for at least the transmit FIFO, and the initial addresses for at least the write pointer storage register for the transmit FIFO. These instructions are decoded by the instruction decode logic 96 and cause the proper ones of the multiplexers A-F and H-I to select their inputs coupled to the NPI bus 102 at the time that the pointer storage register to be loaded has valid data waiting for it on the NPI bus 102. For example, the node processor will load the starting address for the transmit FIFO into the SAX pointer storage register during one stage of the initialization process. Accordingly, the node processor will issue the instruction ILD-SAX (see Table 1 herein), indicating that the node processor wishes to load the SAX pointer storage register. When this instruction is decoded, the A multiplexer will select its number 2 input (hereafter all inputs for multiplexers in the drawings will be referred to by their input number when counting from left to right) such that the NPI bus is coupled to the data input 106 for the SAX register. The proper starting address can then be loaded on the NPI bus and will be clocked into the SAX register for storage on the next BCLOCK upward transition. The other pointers detailed in FIG. 3 are loaded by issuing one of the instructions shown in Table I to cause the particular multiplexer coupled to the data input of each pointer's storage register to select the NPI bus for coupling to the data input of the pointer storage register. The desired address data can then be loaded into the pointer storage register using the NPI bus.

When the G multiplexer receives a select signal indicating the host write request has been honored for service, this multiplexer will select the WPX register output coupled to its second input for coupling to the address output bus 40. The control logic 125 will also receive the select signal via the line 76 indicating which request is currently being serviced. The control logic will then generate control signals on the bus 41 to control the buffer memory. Specifically, the control logic 70 will assert the signals CS0 NOT and WR NOT to tell the buffer memory that a write operation is requested. Further, the control logic will generate control signals on a bus 43, which will cause the D multiplexer to select its first input for coupling to the data input 108 of the WPX pointer storage register. The first input of the D multiplexer is coupled to the output of the incrementer circuit 82. The input of the incrementer circuit is coupled to the address bus 40 such that the incrementer always receives as its input the currently selected pointer address. The incrementer, which is a conventionally designed ALU, increments the WPX pointer by 1 and couples it to the first input of the D multiplexer. In some embodiments, each address for a selected pointer will be valid for one period of the byte clock signal and will be incremented during the next period. In such embodiments, the control logic then causes the input multiplexers C-F for the selected pointer to select its first input coupled to the output of the incrementer such that every clock cycle will cause the loading of an incremented address into the pointer storage register currently selected. This goes on for as many clock cycles as the selected pointer is selected. In the preferred embodiment, as will be described more fully below, each pointer address is valid for two clock cycles of the byte clock signal. This allows pipelined arbitration as will be described in more detail below. Thus, in the preferred embodiment, when the WPX pointer is selected for output, the control logic causes the D multiplexer to select its number 4 input during the two clock cycles of the bus transfer period on the data bus for one word, and causes the D multiplexer to select its number 1 input at the end of the second clock cycle of the service period so that the WPX pointer will be incremented by 1 for the next two cycle service period if the WPX pointer is still selected during the next service period. This process continues until all the words of the packet to be stored in the buffer memory by the host system 36 are so stored.

When the host system is writing data to the buffer memory 38, the select signal from the arbitration logic 62 to the G multiplexer causes that multiplexer to select the WPX pointer and output it on the address bus 40. A comparator 88 has one of its comparison inputs coupled via the line 90 to the address bus 40. The other input of this comparator 88 is coupled to the output of the J multiplexer, which has as its inputs the end address pointers for both the transmit and receive FIFO buffers. These addresses have been previously loaded by the node processor 52 in the EAX and EAR pointer storage registers. This loading was accomplished as described above by causing the H multiplexer to select its number 2 input coupled to the NPI bus after issuance of a load EAX instruction, and by causing the I multiplexer to select its number 1 input after issuance of a load EAR instruction by the node processor. When the host system is writing data to the buffer memory, the control logic, which will be collectively referred to by reference number 125 in FIG. 4, causes the J multiplexer to select its number 1 input for coupling to the B input of the comparator 88. Thus, the comparator 88 compares the selected pointer value, in this case WPX, to the end address for the transmit buffer. The comparator 88 outputs a signal on a line 94 coupled to the control logic 125 which indicates whether the selected pointer is equal or not equal to the appropriate end address for the buffer to which the selected pointer pertains, i.e., the transmit buffer in this example. The control logic allows incrementing of the selected pointer to proceed until such time as the signal on line 94 indicate that the selected pointer is equal to the end address. At that point, the control logic 125 causes the input mutiplexer for the selected pointer, in this case the D multiplexer, to select the input coupled to the output of the appropriate starting address pointer storage register, i.e., the number 2 input for the D multiplexer. This causes the storing of the starting address for the appropriate buffer, in this case the transmit buffer, into the selected pointer storage register, i.e., the WPX pointer storage register. Thus, incrementing for further transactions begins from the starting address of the appropriate buffer. To summarize the process for the example of the host system writing data into the buffer memory 38, the WPX pointer will be continuously incremented as long as it is selected until such time as it equals the end address for the transmit buffer. At that time, the signal on the line 94 will change states, and the control logic 125 will cause the D multiplexer to select its number 2 input, thereby loading the starting address for the transmit buffer from the SAX pointer storage register into the WPX pointer storage register. If the WPX pointer continues to be selected for further transactions, incrementing will continue from the starting address of the transmit buffer.

The data path controller and media access controller modules will be signaled that there is a packet ready for transmission on the medium 20 said packet having been loaded into the buffer memory 38 by the host system or by the node processor. When access to the medium 20 is obtained, the data path controller 43 will assert a service request requesting that data be read from the buffer memory 38. This request from the data path controller takes the form of assertion of the signal DRDREQS or DRDREQA in FIG. 2. These two signals stand for data path controller read request synchronous and data path controller read request asynchronous. The assertion of a data path controller read request causes the control logic 125 to generate the proper select signal to the G multiplexer to select the RPX pointer. This pointer is the read pointer for the transmit buffer. The control logic 125 also causes the C multiplexer to select the number 3 input during the two cycles of the service request so as to maintain the RPX pointer constant at its then existing value. At the end of the second cycle of the service request, the control logic 125 causes the C multiplexer to select its number 1 input coupled to the output of the incrementer 82 to allow the RPX pointer to be incremented. As long as the RPX pointer is selected, it will be maintained constant during two clock cycles and will be incremented at the end of every service cycle. That is, the address or RPX pointer output on address bus 40 causes the buffer memory 38 to retrieve the data at the specified address and output it on the data bus 42. The data path controller and media access controller circuitry then processes this data and, with the help of the encoder/decoder 28 and transceiver 22, transmits the data on the medium 20.

As in the case of the WPX selection, the RPX pointer is constantly compared to the end address for the transmit buffer by the comparator 88 while RPX is selected. If at any time RPX become equal to EAX, the signal on line 94 changes state, thereby causing the control logic 125 to generate a select signal to the C multiplexer. This select signal causes the C multiplexer to select its number 4 input, thereby loading the starting address for the transmit buffer into the RPX pointer storage register from the SAX pointer storage register.

When data arrives on the medium 20, the data path controller will assert a write request in the form of activation of the signal DWRREQ. This causes the control logic 125 to generate a select signal to the G multiplexer to select its number 4 input, thereby outputting the WPR pointer on the address bus 40. As before, the control logic 125 will cause the F multiplexer to select its number 3 input for the two clock cycles of the transaction time for one word of the incoming data. At the end of the two cycle service period, the control logic 125 will cause the F multiplexer to select its number 1 input, thereby allowing the WPR pointer to be incremented at the start of the two clock cycles representing the next WPR address and service period. Again, the WPR pointer address on the address bus 40 is compared by the comparator 88 to an end address for the appropriate buffer, i.e., the receive buffer. In this case the control logic will order the J multiplexer to select its number 2 input such that the end address for the receive buffer is coupled to the B input of the comparator 88. When the WPR pointer equals the EAR end address, a signal on the line 94 will change states, thereby causing the control logic 125 to generate a select signal to the F multiplexer, causing it to select its number 4 input, thereby loading the starting address for the receiver buffer into the WPR pointer storage register.

After the incoming data has been loaded into the buffer memory 38, the host system 36 may, at its leisure, assert a read request signal to the arbitration logic 62. This event would take the form of assertion of the signal HSRDRQ on bus 103 in FIG. 2. If this is the highest priority request then pending, the arbitration logic 62 would generate a select signal which would cause the G multiplexer to select its number 3 input, thereby outputting the RPR pointer address on the address bus 40. The control logic 125 would be notified on the control line 76 of the winning request and would know that a read transaction was requested. The control logic 125 would then generate the proper control signals on the bus 41 to the buffer memory to select the buffer memory and cause it to perform a read transaction. The buffer memory would then access the data stored in the address pointed to by the address on bus 40 and outputed on the data bus 42. The host system could then read the data on the data bus 46 and do with it whatever needed to be done. The control logic 125 would also generate the proper control signals to cause the E multiplexer to select its number 3 input during the two cycles of the read transaction for each word and to select its number 1 input at the end of each service period to allow the RPR pointer storage register contents to be incremented by one.

The comparison of the RPR pointer to the end address for the receive buffer EAR occurs as described above for the other pointers. If the RPR pointer becomes equal to EAR, the control logic 125 orders the E multiplexer to select its number 4 input, thereby loading the starting address for the receive buffer into the RPR pointer. As in the case of the other pointers, the E multiplexer selects is number 3 input for the two cycles of the service period, and it selects its number 1 input at the end of the service period to allow the RPR pointer to be incremented.

That completes the basic description of the operation of the RAM buffer controller in managing two FIFO buffers in a single physical memory 38.

INDEPENDENT INITIALIZATION

It is important for flexibility of design and use of a RAM buffer controller to be able to initialize any of the pointers of the system independently of any of the other pointers of the system. To that end, the invention utilizes a series of input multiplexers denoted by the letters C-F in FIG. 4, each of which has one input which is coupled to the NPI bus 102. The output of the incrementer 82 is coupled to another input of each of these input multiplexers. Because the NPI bus and the output of the incrementer on the bus 83 do not have to pass collectively through a common multiplexer with its output coupled to an input of each of the input multiplexers, it is possible to initialize any of the pointer storage registers from the NPI bus while selecting another pointer for output on the address bus 40. That is, if any particular pointer address storage register is selected for output of its contents by the G multiplexer onto the address bus 40, then any of the other pointer storage registers not so selected may be initialized through the NPI bus 102 without interfering with the selection and incrementation of the pointer address in the selected pointer storage register. This is done by issuing the appropriate load instruction on the instruction bus 98 thereby causing the control logic 125 to cause the appropriate input multiplexer to select its input coupled to the NPI bus. If the node processor attempts to initialize the pointer currently selected, an error condition results and an interrupt is generated.

RANDOM ACCESS POINTER FOR NODE PROCESSOR SERVICE REQUESTS

In FIG. 4 there is a pointer storage register designated MAR which is used to store a pointer address (also referred to as an address pointer) for servicing node processor read or write requests. The random access pointer MAR can be initialized by the NPI bus in the same manner as any of the other pointers. To initialize the MAR, the node processor issues a load MAR instruction which is decoded and causes the control logic 125 to send a select signal to the K multiplexer causing it to select its number 2 input to couple the NPI bus to the data input of the MAR pointer storage register. The desired address can then be loaded on the NPI bus, and it will be stored in the MAR register. Thereafter the node processor may assert a service request in the form of activating one of the signals NPRDQ or NPWRRQ in FIG. 2. If either of these lines is activated, the request arbitration logic 62 causes the G multiplexer to select its number 5 input, thereby outputting the MAR pointer on the address bus 40. Depending on which of the node processor signals is activated, the control logic 125 generates the proper control signals on the bus 41 to cause the buffer memory 38 to either read data stored at the address on address bus 40 and output it on the data bus 46, or input data from the data bus 46 and store it in the address existing on the address bus 40.

When the MAR random access pointer is selected for output by the G multiplexer, the comparator 88 compares it to the ending address for the transmit buffer or for the receive buffer, but the output signal of the comparator on line 94 is ignored by the control logic 125. The reason for this is that the random access pointer is not limited by any address limitations of the FIFO or LIFO buffers managed by the RAM buffer controller. That is, the random access pointer may be set to any address within the physical address space of the buffer memory 38.

Any node processor service request has the second highest priority in arbitration, and is serviced only if a data path controller request is not present simultaneously. There is a command register in the control logic 125 which contains a command bit called CENNPRQ. This command bit can be set or cleared to enable or disable the node processor requests. It would normally be set to disable node processor requests while a DPC request was being serviced. When a node processor request is being serviced, the control logic generates an acknowledge signal which is active for the duration of the transfer. There is a separate acknowledge signal for a node processor read request and another acknowledge signal for a node processor write request. The node processor inputs data from the buffer memory on the data bus 46 at its data port in FIG. 1 and the same data port is used for outputting data to be stored in the buffer memory 38. Since the random access pointer register is not subject to reloading with a starting address upon reading an ending address of either the transmit or receive FIFOs, the random access pointer MAR will be continuously incremented during the entire time it is selected until it reaches its highest value of all ones. At that point it will be reset to a value of all zeros.

Node processor service requests are typically used by the node processor to do block DMA transfers of data to or from the memory. The acknowledge signals for the node processor service request are output from the control logic 125 on a bus 68 in FIG. 4. A status signal NPPND is provided on the bus 68 to indicate to the node processor whether there are any requests pending to be serviced. Likewise, when a host system service request is being serviced, one of two acknowledge signals on the bus 68 dedicated to acknowledging host service requests is active. There is a separate acknowledge signal for a host read transaction and another acknowledge signal for a host write transaction. Both types of host requests have equal priority and are serviced alternately. The same is true for node processor requests in that node processor read and write requests cannot be serviced simultaneously, but must be serviced alternately. Two command bits are provided to independently enable or disable the host system read request and host system write request input ports. These command bits are resident in a command register (not shown) located in the control logic 125.

Typically the random access pointer MAR is used by the node processor to look at headers of packets after a packet has been received. That is, the random access pointer can be used as part of the mechanism used by the node processor to filter out packets that are not addressed to the host system 36 or which have been received but in which CRC errors have been detected.

The node processor has a way of preventing the incrementer 82 from incrementing the MAR pointer such that this pointer can be used for a read-modify-write cycle on buffer memory 38, which otherwise would not support this type of data transaction. To implement a read-modify-write transaction or otherwise block the incrementer 82 from incrementing the selected pointer, the node processor would send an instruction via the instruction bus 98 in FIG. 2 to the instruction decoder 96. This instruction could be one of the reserved instructions in Table 1. The instruction could be encoded and a signal transmitted on the line 100/101 to the incrementer 82 to prevent it from incrementing. In the case where the G multiplexer has selected the MAR pointer, the node processor could use the initial address of the MAR pointer and assert a read request. The data output from the buffer memory could then be input by the node processor 52 and modified. The node processor could then assert a write request and transmit a do not increment instruction to the RAM buffer controller. Then the node processor would issue a write request and then write the modified data to the same memory address from which it was read. The do not increment signal on line 101 in FIG. 4 is used to block the carry-in input to the incrementer ALU to block incrementation.

In the preferred embodiment, there are four instructions given in Table 1 for allowing the node processor to assert read or write requests either with or without incrementing. These instructions are given in Table 1 above with the mnemonics INPRDNI, INPWRNI, INPRDWI and INPWRWI. Each of these instructions can be asserted on the instruction bus 98 by the node processor, and each is decoded by the instruction decoder 96. When each instruction is decoded, one of the four line in the bus 105 coupled to the output of the instruction decoder is asserted. These read and write request lines are OR'ed in the request arbitration logic 62 with the hardware read and write request lines on the bus 101 from the node processor. Thus the node processor can assert its DMA requests either by asserting one of the signals NPRDQ or MPWRRQ on the bus 101 or by issuing one of the software instructions noted above. However, the node processor cannot assert both a hardware request and a software request at the same time since the MAR is selected by the control logic for any node processor service request and inconsistencies could develop.

The foregoing instructions may be used to implement a read-modify-write sequence as follows. The node processor issues instruction INPRDNI to read the memory location pointed to by the MAR but the MAR is not incremented. The data is then modified, and the node processor issues instruction INPWRWI to write the modified data back into the same memory location which is then pointed to by the MAR. The MAR is then incremented during the a portion of this write access.

The foregoing instructions may also be used to implement a write-verify sequence as follows. The node processor issues the instruction INPWRNI to write data into the location pointed to by the MAR, and the MAR is not incremented. Thereafter, the node processor issues the instruction INPRDWI to read the contents of the location just written and the MAR contents are incremented during this read transaction.

DATA CHAIN FOR LINKED LIST PACKET TRANSMISSION

It is useful in local area network design to be able to transmit packets which are not located contiguously in memory. That is, it is desirable to have the flexibility to be able to put packets for transmission into random locations in memory and to send them in a predetermined order, regardless of their physical locations in memory. To do this requires a linked-list organization of the data packets which are stored in memory and a mechanism to follow the pointer addresses.

Figure 6:
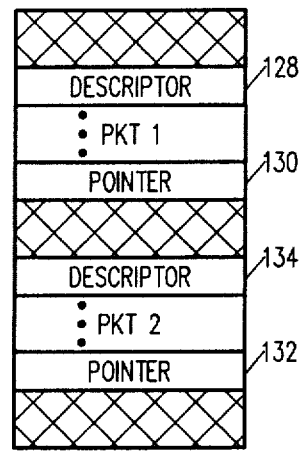
FIG. 6 is a diagram of the organization in memory of two packets organized as a linked list.

Referring to FIG. 6, there is shown such a linked list organization for a linked list of packets which can be transmitted with the use of the RAM buffer controller of the invention. Each packet has a byte called a descriptor at the beginning of the packet followed by one or more bytes of data. The descriptor byte has transmit status and length information stored therein. Each packet is followed by a pointer byte which contains the starting address of the next member of the list to be transmitted. The pointer byte 130 is the pointer byte for packet number 1, while the pointer byte 132 is the pointer for packet number 2. The descriptor 134 is the descriptor for packet number 2. If packet number 2 were to be transmitted following the transmission of packet number 1, the pointer 130 would point to the address of the descriptor 134.

The circuitry of the DPC contains a circuit to identify when a word read from the buffer memory 38 is a pointer address. When the pointer 130 is read at the end of transmission of packet number 1, the contents of pointer 130 would be loaded in the RAM buffer controller as the new value for the RPX read pointer for the transmit buffer. On the next read request for access to the transmit buffer, the address of the descriptor 134 would be found in the RPX pointer storage register and transmission of packet number 2 would begin from that point. If, on the other hand, packet number 2 was to be transmitted first and packet number 1 was to be transmitted following the transmission of packet number 2, then the contents of pointer 132 would be the address of the descriptor 128 for packet number 1. Thus, when descriptor 132 was read, its address contents would be loaded into the RPX pointer storage register, and upon a read request for the transmit buffer again occurring, transmission of packet number 1 would start at the location of the descriptor 128.

Figure 5A:
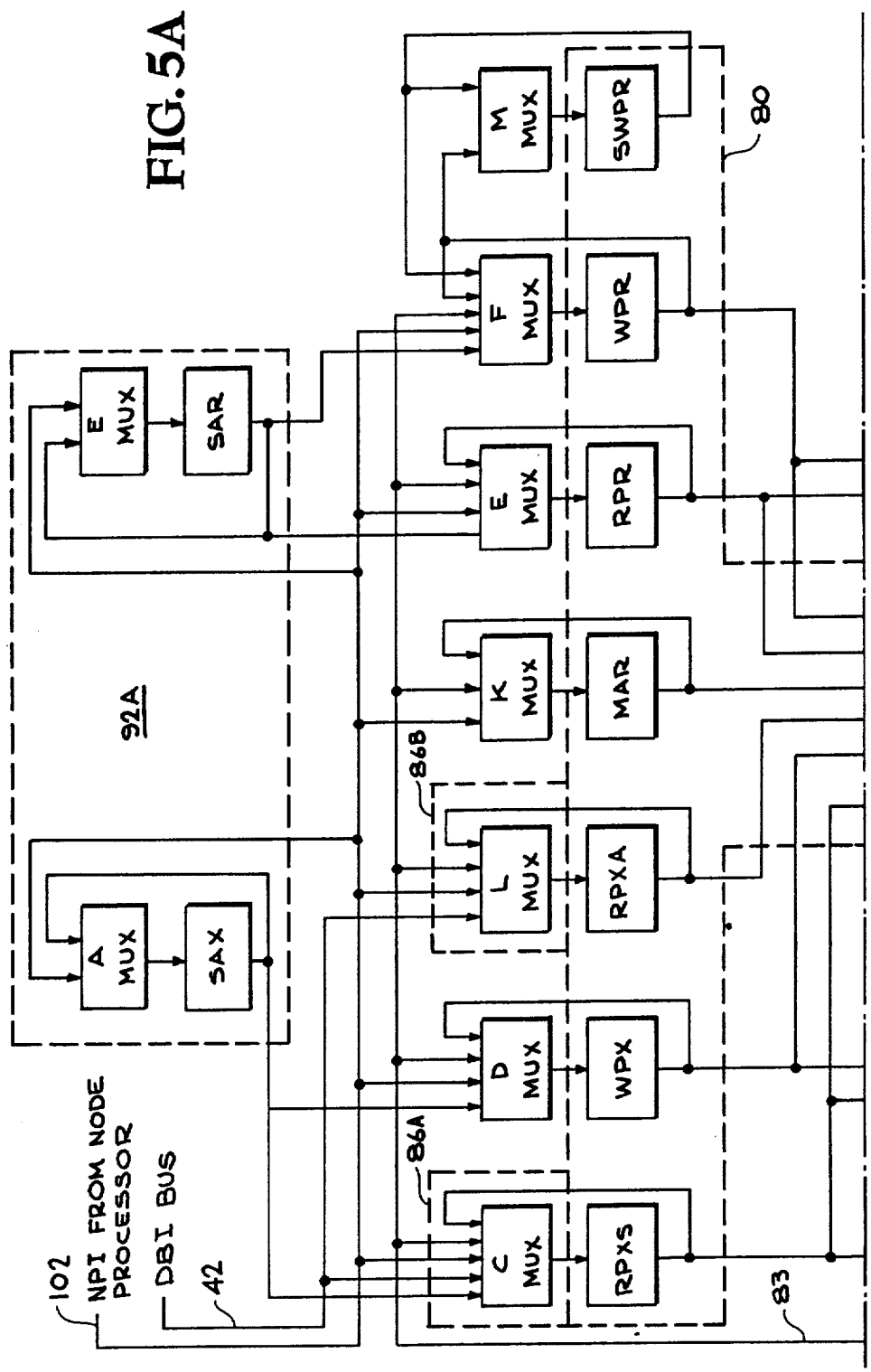
FIGS. 5A and 5B are a more detailed block diagram of the preferred embodiment of the invention.
Figure 5B:
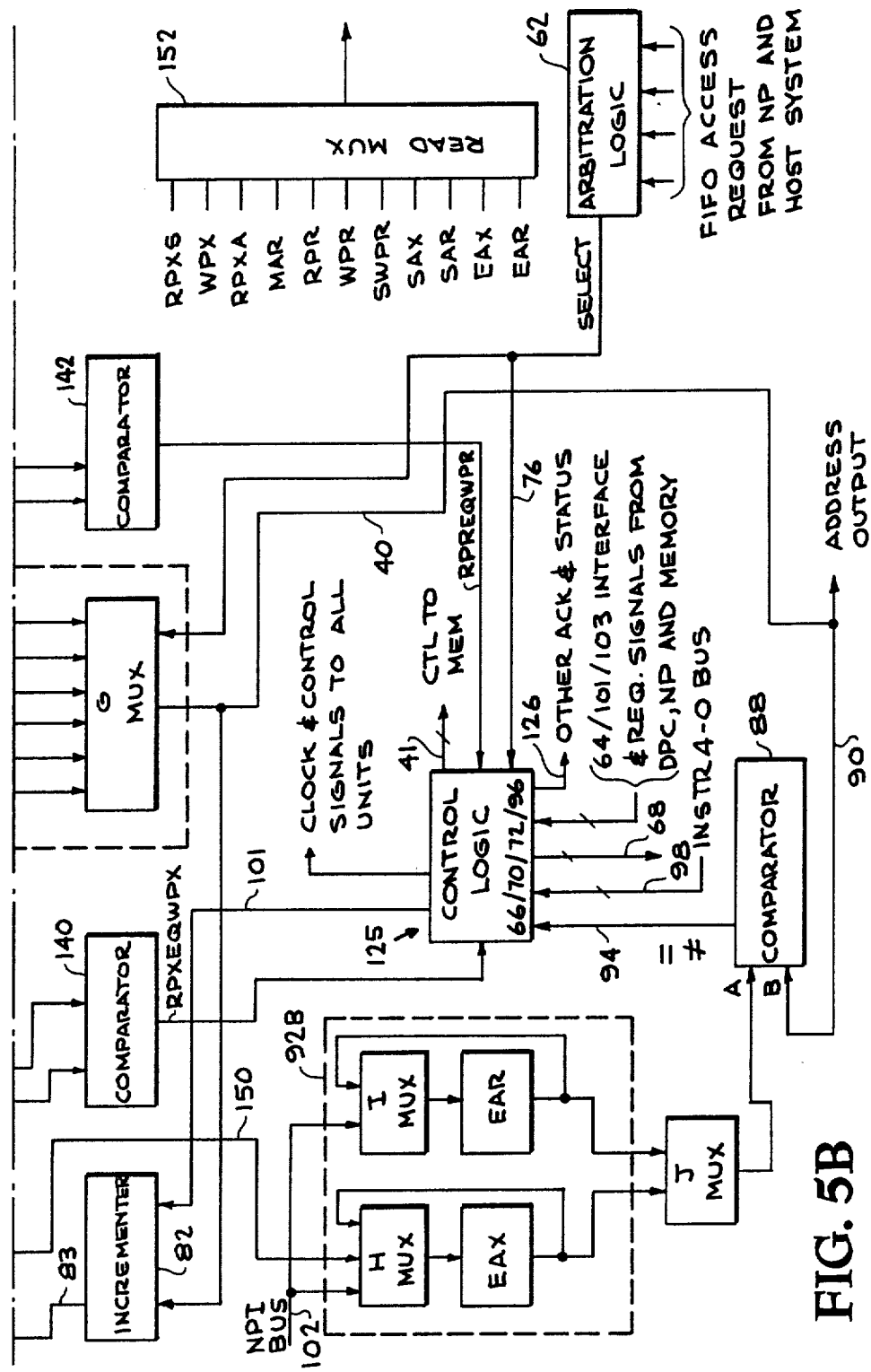

Referring to FIG. 5, there is shown a block diagram of the RAM buffer controller in its preferred embodiment. The portion of the RAM buffer control circuitry which supports the linked-list transmission of packets is the data bus 42 and its connection to one of the inputs of the input multiplexer controlling the data inputs of the read pointer for the transmit buffer. In the preferred embodiment, there are two read pointer storage register for the transmit buffer, designated, respectively, RPXS and RPXA. The data bus 42 is coupled to one input of each input multiplexer controlling the data inputs for the RPXS and RPXA pointer storage registers.

When the data path controller is performing read operations from the transmit buffer during linked-list transmit mode, it detects the reading of pointer addresses such as pointers 130 and 132. When such a pointer is read by the data path controller 43 in FIG. 1, the data path controller asserts an interface signal to the RAM buffer controller called LDRPXS or LDRPXA, depending upon which pointer storage register is assigned to the particular linked list being transmitted. When the control logic detects the activation of this signal on bus 64, it signals the appropriate one of the input multiplexers C or L to select the input coupled to the DBI bus 42. Because at that time the contents of the pointer will be resident on the DBI bus 42, the pointer address is loaded into the appropriate one of the RPXA or RPXS pointer storage registers on the next upward transition of the BCLOCK signal.

The embodiment of FIG. 5 shows two full/empty comparators 140 and 142. The comparator 140 has one compare input coupled to the output of the RPXS pointer and the other input coupled to the output of the WPX pointer. The comparator 140 serves to compare these two pointers and generate a transmit buffer full-/empty signal called RPXEQWPX, which is coupled to the control logic 125. The signal RPXEQWPX become active when the read pointer and the write pointer for the transmit buffer become equal. This condition indicates either that the transmit buffer is full or that it is empty. The control logic 125 determines which case is true by examining the last transaction which occurred in the service request prior to the cycle during which the signal RPXEQWPX became active. If the last transaction before the two pointers became equal was a read, the transmit FIFO is empty. If the last transaction before the two pointers became equal was a write, then the transmit FIFO is full.

The comparator 142 acts in a similar manner as the comparator 140 in monitoring the full/empty status of the receive FIFO. The comparator has one compare input coupled to the output of the RPR register, and another compare input coupled to the output of the WPR register. When the read pointer for the receive FIFO and the write pointer for the receive FIFO become equal, the comparator 142 activates the signal RPREQWPR coupled to the control logic 125. The rule for determining whether the receive FIFO is full or empty is the same as the rule for the transmit FIFO.

When in the linked-list mode of transmission of packets, the output signals from the comparators 140, 142 and 182 are ignored by the control logic 125. The reason for this is that in the linked-list mode of transmission, the RPXS and RPXA pointers will be jumping around the physical address space of the memory. Thus, the comparison of these pointer values to an end address value and full/empty comparisons will be meaningless.

UTILIZATION OF SAX AND EAX AS NEW LINK AND SAVE POINTER STORAGE REGISTERS

While in the linked-list mode of transmission, there is no starting address or ending address for the transmit FIFO. Accordingly, the SAX and EAX pointer storage registers are being wasted. There are some situations such as ring recovery, where it is necessary to jump to a fixed packet location and transmit that packet over the medium to aid in recovery of the ring from some error conditions. To effectively do this, it is necessary to load the starting address of the ring recovery packet into the RPXS pointer storage register as the "new link" pointer. Thus, when the ring recovery signal or other new link signal is asserted, the control logic 125 causes the C multiplexer in FIG. 5 to select its number 1 input in FIG. 5 so as to load the current contents of the SAX pointer storage register into the RPXS storage register.

Before this occurs, however, it is necessary for the node processor to load the new link address in the SAX pointer storage register. This is done as described earlier for initialization of the pointers in the RAM buffer controller.

After the ring recovery has occurred, it is useful to resume transmission of the packet which was interrupted by the ring recovery situation at the location where transmission ceased. To do this, the contents of the RPXS pointer storage register must be saved as it exists at the time that the new link pointer is loaded into the RPXS pointer storage register. The EAX pointer storage register can be used for this purpose. To do this, however, a new pathway must be added between the output of the RPXS storage register and the input of the EAX pointer storage register. This pathway is bus 150 in FIG. 5. This bus 150 is coupled to one input of the H multiplexer. At the time that a ring recovery situation or other "new link" situation arises, the control logic sends a select signal to the H multiplexer causing it to select its number 2 input coupled to this bus 150 such that the contents of the RPXS pointer storage register is loaded into the EAX pointer storage register on the next clock uptick. After this loading occurs, the control logic 125 sends a select signal to the H multiplexer causing it to select its input number 3, which is coupled to the output of the EAX storage register, such that the contents of the EAX pointer storage register is maintained constant.

The node processor can read the contents of any pointer storage register in the RAM buffer controller of FIG. 5 by sending a read instruction for the particular pointer storage register of interest to the control logic 125 over the instruction bus 98. There is a multiplexer which has one input coupled to the data output of each of the pointer storage registers in the RAM buffer controller. In FIG. 5 this multiplexer is shown at 152.

When it is desired to resume packet transmission in the linked-list mode after a ring recovery situation has occurred, the node processor may send a read EAX instruction to the control logic 125 which will be decoded and will cause the read multiplexer 152 to select its input coupled to the output of the EAX pointer storage register. The data in the EAX pointer storage register may then be reloaded into the RPXS pointer storage register via the NPI bus 102. The data path controller can then again assert a read request for access to the transmit buffer such that RPXS is selected by the G multiplexer for output on the address bus 40. Transmission will then resume with the packet which was interrupted by the ring recovery situation.

In the preferred embodiment, in a ring recovery situation, the node processor does not restore the contents of the EAX pointer storage register into the RPXS pointer storage register. Instead, it uses the contents of the EAX pointer storage register as an indication of how many packets were successfully transmitted before the interruption. The node processor then determines which packet must be the first one sent from the linked-list transmission that was interrupted, i.e., it determines and loads into RPX the address of this descriptor of the first packet which was not successfully transmitted.

RECEIVING NORMAL PACKETS AND FLUSHING AND ABORTING RECEIVED PACKETS

Figure 7:
FIG. 7 is a diagram of the organization of the fields of a typical packet.

FIG. 7 shows a typical data structure for a packet transmitted on the medium 20 in FIG. 1. A first field or group of fields will hold control information, and these fields will be followed by a destination address indicating the particular host system to which the data portion of the packet is addressed. The source address follows the destination address and gives the network address of the originating host system which transmitted the data. Following the source address there will one or more bytes of data comprising the subject matter of the packet followed by one or more bytes of CRC data which provide check bits to improve the reliability of the data.

When a packet is transmitted on the network, all node processors on the network begin copying the incoming data into the buffer memory. Typically, there may be ten or more control bytes in the control field before the destination address arrives. These ten or more control bytes must be copied into the buffer memory 38 in case the destination address proves to be the address of the particular host system at that node. If, however, after the control bytes have been stored, the destination address arrives and is compared by the node processor to the address of the host system at that node and the two do not match, then it is necessary to flush all the control bytes and other bytes received in that packet so as not to waste memory space with unneeded data. Also, it sometimes happens that entire packets are received but, upon processing the CRC bytes which follow the data portion of the packet, it is discovered that an error in transmission has occurred and the data in the packet is not reliable. In such a case, it is again necessary to flush all the bytes of the packet to free memory space for valid packets.

The mechanism in the preferred embodiment to do this flushing is the shadow write pointer storage register, designated SWPR in FIG. 5. This shadow write pointer has an M multiplexer which controls the data inputs of the SWPR pointer storage register. This M multiplexer has one of its inputs coupled to the output of the WPR storage register and has the other input coupled to the output of the SWPR pointer storage register. The output of the SWPR pointer storage register is also coupled to one of the inputs of the F multiplexer, which controls the input of the WPR pointer storage register.

The concept of packet flushing involves saving the contents of the WPR into the SWPR pointer storage register at the beginning of reception of each packet. In this way the SWPR storage register stores the contents of the WPR pointer storage register as it existed at the time when packet reception commenced. Then, if it is necessary to flush the packet, the contents of the SWPR register are restored to the WPR pointer storage register, thereby resetting it to the position that it had at the beginning of the reception of the faulty packet.

Figure 8:
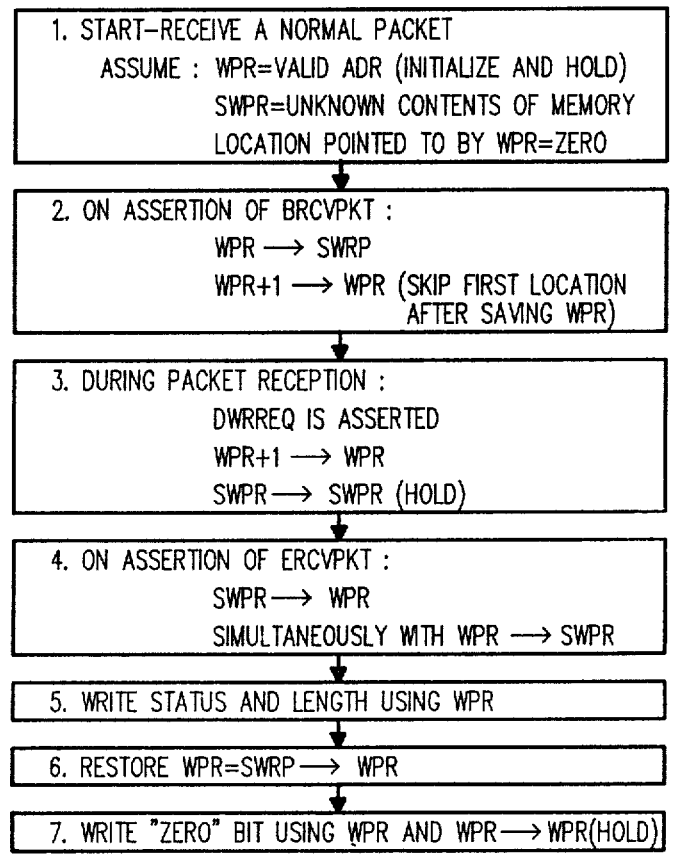
FIG. 8 is a flow chart of the algorithm used by the invention to receive a normal packet.
Figure 9:
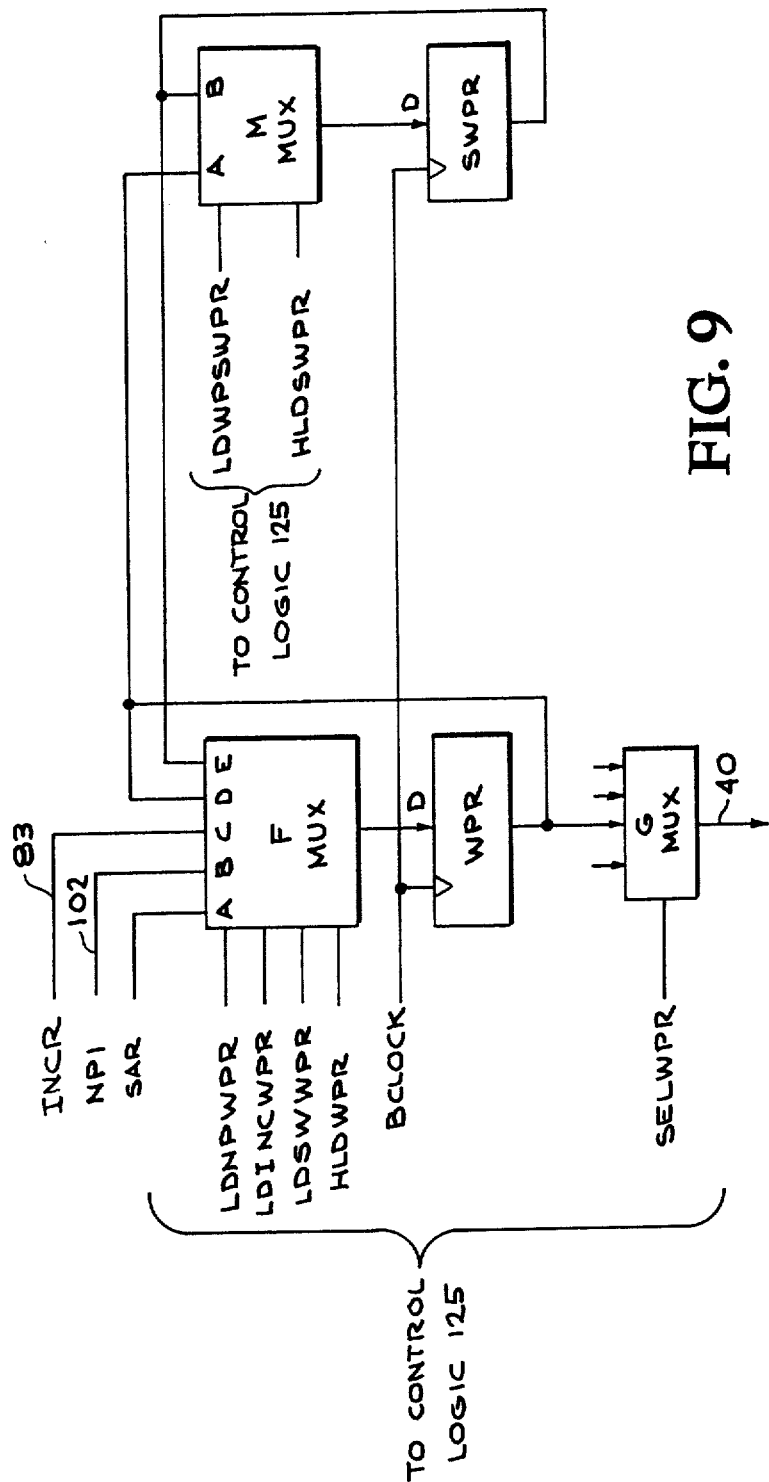
FIG. 9 is a more detailed diagram of the various multiplexers and registers involved in the three receive algorithms described in the specification.
Figure 10:
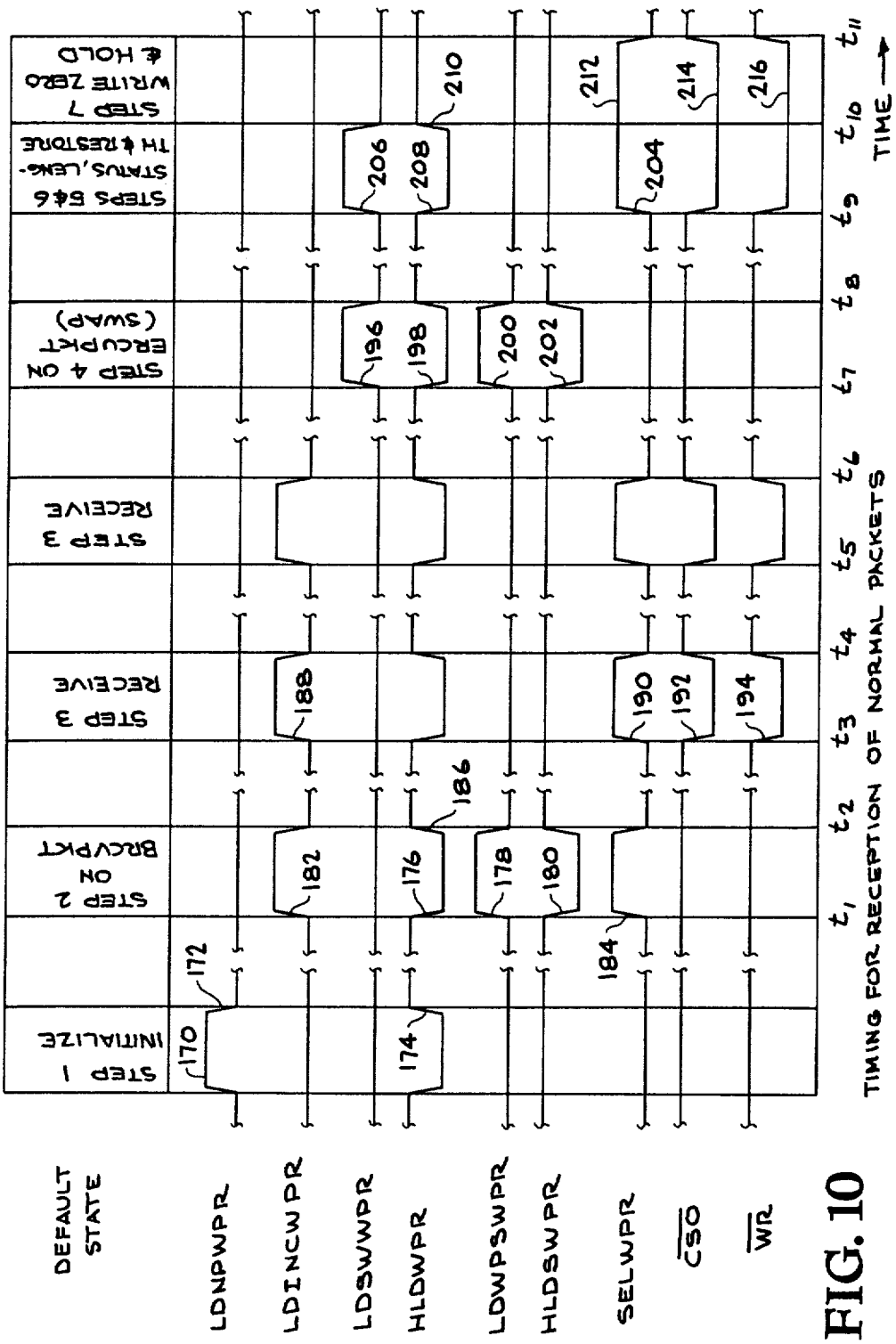
FIG. 10 is a timing diagram of the relationships of the signals involved in the algorithm for receiving normal packets.

To best understand the process for flushing packets, it will be instructive to first examine the process of receiving a normal packet. FIG. 8 is a conceptual diagram of the algorithm for receipt of a normal packet. FIG. 9 is a more detailed block diagram showing the various multiplexer select signals for the F and M multiplexers controlling the WPR pointer storage register and SWPR pointer storage register. These select signals are manipulated by the control logic to implement the algorithm of FIG. 8 in accordance with the timing diagram shown in FIG. 10. FIG. 10 relates the timing relationship of all of these select signals shown in FIG. 9 to implement the algorithm of FIG. 8 for reception of a normal data packet. Referring jointly to FIGS. 8, 9, and 10, the first step in receiving a normal data packet is to initialize the WPR pointer storage register to a valid address. To do this, the control logic 125 asserts the signal LDNPWPR at 170 in FIG. 10. This causes the F multiplexer to select its B input for application to the data inputs of the WPR pointer storage register. The B input is connected to the NPI bus, which will have previously been driven by the node processor to an address state of an address in which the node processor wishes the first word of the incoming packet to be stored. If packets are to be stored contiguously in memory, the initialization step may be omitted after the first initialization occurred, since the WPR pointer storage register will be continuously incremented until it reaches the end address of the receive FIFO. After a sufficient amount of time for the loading of the WPR register to occur, the signal LDNPWPR is deactivated at 172. The WPR pointer storage register must then be held at the initialization value. Therefore, the control logic asserts the signal HLDWPR at 174 in FIG. 10. The signal HLDWPR remains asserted for as many clock cycles as occur prior to the beginning of reception of an incoming packet. In other words, reception of a packet does not actually begin until step 2 in FIGS. 8 and 10.

The beginning of receipt of a packet is signaled by the assertion of a signal BRCVPKT on bus 64 in FIG. 2 from the data path controller. Upon the assertion of the signal BRCVPKT, several things happen. Conceptually, as seen from step 2 of FIG. 8, the contents of the WPR pointer storage register are loaded into the shadow write storage register, SWPR, and the WPR pointer storage register is incremented by one, thereby skipping the first location after saving the contents of the WPR. To implement this sequence of events, the control logic deactivates the select signal HLDWPR, thereby deselecting the D input of the F multiplexer. As long as the D input of the F multiplexer is selected, the WPR output data will be fed back into its D input such that every uptick of the clock signal BCLOCK will reload the WPR with its presently existing data, thereby holding it at a constant address.

To load the contents of the WPR pointer storage register into the SWPR pointer storage register, the control logic at t1 asserts the signal LDWPSWPR at 178 in FIG. 10. At 180 the control logic deactivates the signal HLDSWPR, which is normally active at all times except times when the SWPR pointer storage register is being loaded with new data. The select signal LDWPSWPR causes the M multiplexer in FIG. 9 to select its input A. This selects the output of the WPR pointer storage register for application to the D input of the SWPR pointer storage register. Upon the next occurrence of a BCLOCK upward transition, the transfer will occur. To cause the WPR pointer storage register contents to be incremented by one, the control logic at time t1 in FIG. 10 asserts the select signal LDINCWPR, as shown at 182 in FIG. 10. The control logic at time t1 will assert the signal SELWPR. This causes the G multiplexer to select the input coupled to the WPR pointer storage register output for output on the address bus 40. This couples the WPR pointer storage register current contents to the input of the incrementer 82 in FIG. 5. The incrementer 82 then adds one to the contents of the WPR pointer storage register and outputs the incremented value on the bus 83. The assertion of the signal LDINCWPR at t1 in FIG. 10, as shown at 182, causes this incremented value present at the C input of the F multiplexer in FIG. 9 to be loaded into the WPR pointer storage register on the next upward transition of the BCLOCK signal. The result is that the WPR pointer storage register contents are incremented by one after storing the original contents in the shadow pointer register. After all these events have transpired, at a time t2 the various signals activated and deactivated at time t1 revert to the state they had just prior to the occurrence of time t1.

Between times t2 and t3 in FIG. 10 some arbitrary number of BCLOCK periods will have passed before the first bytes of data in the packet being received first appear on the data bus 46 in FIG. 1.

At time t3 the first data packet word arrives. The occurrence of this event is signaled by the assertion of the signal DWRREQ in FIG. 2 from the data path controller 43. This represents a data path controller write request. It causes the control logic 125 to continuously increment the WPR pointer storage register after each word is written and to continue to hold the shadow write pointer storage register at the value loaded from the WPR pointer storage register in step 2 of FIG. 8. During the time between t2 and t3, the WPR pointer storage register was placed in the hold status by assertion of the signal HLDWPR, as shown at 186 in FIG. 10. This caused the F multiplexer to select its D input for application to the data input of the WPR pointer storage register. At time t3 this hold is removed, and the control logic asserts the signal LDINCWPR, as shown at 188, and asserts the signal SELWPR, as shown at 190. At the same time, the control logic asserts the signal CSO NOT, as shown at 192, to enable the buffer memory 38, and the control logic asserts the signal WR NOT at 194 to inform the buffer memory that a write transaction is requested. The assertion of SELWPR causes the current content of the write pointer storage register, WPR, to be output on the address bus 40. The first word of the received packet to be written into the buffer memory at the address on bus 40 has previously or simultaneously been placed on the data bus 46 by the data path controller 43. The buffer memory then writes the data on the data bus into the address pointed to by the current contents of the WPR pointer storage register. The simultaneous assertion of LDINCWPR causes the contents of the WPR pointer storage register to be incremented by one on the next upward transition of the BCLOCK signal by virtue of the incrementer having the WPR pointer applied to its inputs and the incremented value applied to the C input of the F multiplexer.

At time t4 all the signals asserted or deactivated at time t3 revert to their states just prior to time t3.

Between times t4 and t5 any number of BCLOCK periods occur, and the control logic asserts the signal HLDWPR to hold the contents of the WPR pointer storage register constant. At time t5, the data path controller again asserts the write request signal DWRREQ and places another word from the packet onto the data bus 46 in FIG. 1. The same sequence of events that occurred at t3 now occur again at t5, and the word then on the data bus 46 is stored in the memory location in the buffer memory just following the memory location in which the word stored between times t3 and t4 was stored.

When the data path controller and the other circuitry in the system of FIG. 1 detect the end of the incoming packet, the data path controller asserts the signal ERCVPKT on bus 64 in FIG. 2. This is the signal which causes the exchange of pointer register contents symbolized by step 4 in FIG. 8 to occur. Conceptually, the contents of the shadow write pointer storage register are loaded into the WPR pointer storage register and the contents of the WPR pointer storage register are loaded into the shadow write pointer storage register simultaneously. The control logic 125 implements this swap by asserting and deasserting various signals at time t7 in FIG. 10. As shown at 196, the select signal LDSWWPR is asserted, causing the F multiplexer to select its E input for application to the data input of the SWPR pointer storage register. The E input of the F multiplexer is coupled to the output of the SWPR pointer storage register. Therefore, this causes loading of the then existing contents of the SWPR register into the WPR pointer storage register. To do this successfully, the control logic deasserts the select signal HLDWPR as shown at 198 to release the hold on the contents of the WPR pointer storage register. The control logic also asserts the select signal LDWPSWPR, as shown at 200, to cause the M multiplexer to select its A input for application to the data input of the SWPR pointer storage register. The A input of the M multiplexer is coupled to the output of the WPR pointer storage register, and therefore, the contents of the WPR pointer storage register are loaded into the SWPR register upon the next upper transition of the BCLOCK signal. The control logic also deactivates the select signal HLDSWPR at that time to allow the swap to occur.

By the time t8 in FIG. 10, the contents of the WPR pointer storage register will have been swapped with the contents of the SWPR pointer storage register. This means that the contents of the WPR pointer storage register are now equal to the address that the WPR register stored at the beginning of reception of the packet in step 2 of FIG. 8 before the WPR register was incremented in step 2. That is, if a packet occupies address locations 1-100 in memory, then the data words in the packet will occupy locations 2-100 and the WPR pointer storage register will contain an address pointing to storage location 1 upon completion of step 4 in FIG. 8. In other words, location 1 is the memory location skipped by the incrementation that occurred in step 2 of FIG. 8.

Further, location 1 is the location in which the status and length information for the packet is stored. It is useful in local area network design to store status and length information with each packet. This information indicates whether or not it is a valid packet and the length of the packet in terms of the number of memory locations consumed by the packet. It is useful to put this status and length information at the beginning of the packet rather than at the end of the packet. The reason for this is that it simplifies the software overhead in the node processor, because the node processor knows exactly where to look for the status and length information in each packet without having to know how long the packet is, which it would have to know if the status and length information were stored at the end of the packet.

Step 5 in FIG. 8 represents the step of writing the status and length information in the first memory location of the packet. In the hypothetical example just given, this would mean the status and length location would be written into memory location 1. This occurs at time t9 in FIG. 10.

In FIG. 10 the interval between t9 and t10 shows the control signals as they are activated and deactivated to implement both steps 5 and 6 of FIG. 8. Step 5 is implemented by asserting the signal SELWPR at 204, which outputs the current contents of the WPR to the address bus 40. Also asserted are the signals CSO NOT and WR NOT. These two signals activate the buffer memory and tell it that a write transaction is about to occur. The buffer memory then writes into the pointed to location the data on the data bus, which, at time t9, is the status and length information.

Step 6 in FIG. 8 is implemented in FIG. 10 by the assertion of the signal LDSWWPR at 206 and the deactivation of the signal HLDWPR at 208. The events at 206 and 208 in FIG. 10 cause the F multiplexer to select the D input, thereby loading the contents of the SWPR back into the WPR pointer storage register. This leaves the WPR pointer storage register with a pointer address pointing to the memory location which is one greater than the last memory location in which a word from the just received data packet is stored. In the hypothetical example given herein, the WPR pointer storage register would now be pointing to address location 101.

Next, in step 7 in FIG. 8, a zero bit is written into a specific bit location of the memory location just following the last word in the data packet just received, and the WPR pointer storage register is held constant at that pointer address value. That is, in the hypothetical example, step 7 represents the step of writing a zero into a particular bit of memory location 101 and holding the WPR pointer at 101. The reason that this is done is to cause a zero bit to be written into a specific bit of the memory location just following the data packet. When the node processor or host system is reading data out of the receive buffer, and it reads locations 101, it will see this particular bit set at zero. This will tell the node processor or host system that all that follows is not a valid packet. This simplifies the software record-keeping functions of the node processor or the host system, eliminating the need to keep track of the number of valid packets and their lengths, which are currently stored in the receive buffer. Valid packets are designated by writing a one into the designated bit during step 5 of FIG. 8 when the status and length information is written into the first memory location of the packet. Step 7 is represented at t10 in FIG. 10 by the assertion of the signal caps HLDWPR at 210 to hold the WPR content steady by forcing the F multiplexer to select its D input and by continued selection of the WPR output by the G multiplexer by continued assertion of the signal SELWPR at 212. Writing of the zero bit, as required by step 7 of FIG. 8, is accomplished by the continued assertion of the signals CSO NOT and WR NOT at 214 and 216 between times t10 and t11.

PROCEDURE FOR FLUSHING RECEIVED PACKETS

Figure 11:
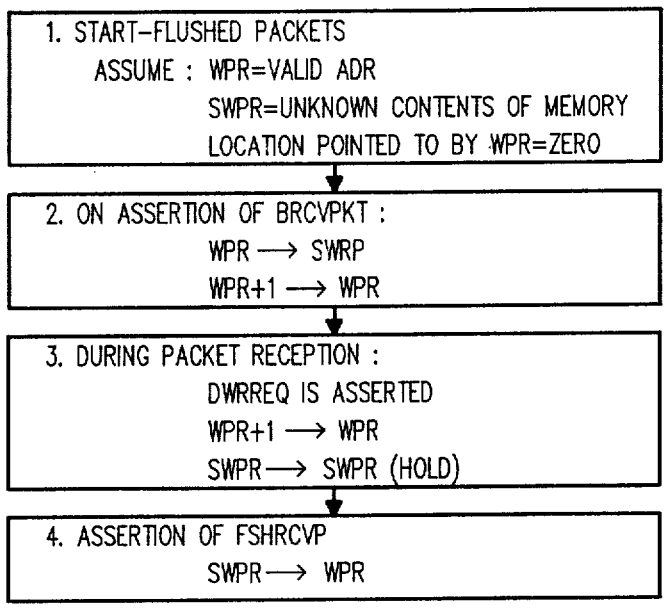
FIG. 11 is a flow chart of the algorithm for flushing packets.

Referring to FIG. 11, there is shown a conceptual diagram of the algorithm for flushing packets which, for one reason or another, need not be retained in buffer memory. Steps 1 through 3 of this algorithm are identical to steps 1 through 3 of the algorithm for receiving a normal packet shown in FIG. 8. Upon detection of the fact that a packet is not addressed to the host system at the particular node or that a CRC error has occurred, the DPC asserts a signal FSHRCVP, meaning flush this packet. This signal, FSHRCVP, is one of the interface signals to the RBC control logic 72 in FIG. 2, which comes from the DPC over the bus 64. When this signal is asserted, the contents of the SWPR pointer storage register are loaded into the WPR pointer storage register. This restores the WPR to the pointer address which it had at the time when packet reception started. In the hypothetical example given above, step 4 in FIG. 11 would restore the WPR pointer address to memory address 1. Since no status and length recording step will have been performed in the algorithm at the time that FSHRCVP is asserted, the status bit at memory location 1 will still be a zero from the previous packet reception. That is, if the previous packet received was normal, the system in step 7 of the algorithm to receive normal packets will have written a zero bit into the memory location following the last word in the previous packet. In the hypothetical example, this assumes that the previous packet's last word will be stored in memory location 0. This zero status bit will indicate to the node processor or host system that all the data which is in a memory location following memory location 1 is invalid data thereby effectively flushing the packet.

PROCEDURE FOR ABORTING RECEIVED PACKETS

Figure 12:
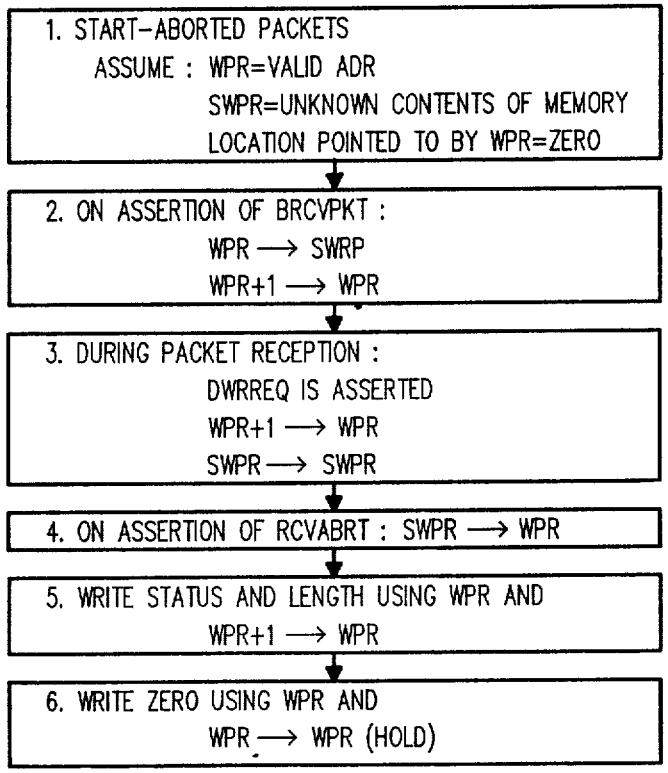
FIG. 12 is a flow chart of the algorithm for aborting packets.

The algorithm of FIG. 12 is the process which the RAM buffer controller implements in the event that a packet is to be aborted. Steps 1 through 3 of the aborted packet algorithm are the same as the first three steps of the algorithm for receiving normal packets as previously described, and will not be described again here. When a packet is aborted, the WPR pointer storage register is reset to the memory location at which it pointed at the time that packet reception began, and status and length information is written. This transaction is symbolized by step 4 in FIG. 12 wherein the contents of the SWPR pointer storage register are reloaded into the WPR pointer storage register. Because in step 2 the contents of the WPR pointer storage register were saved into SWPR, this restores WPR to the pointer address it had at the time when packet reception began. In the hypothetical example given above, the WPR pointer storage register would then be pointing to address location 1.

Step 5 of FIG. 12 represents the step of writing the status and length information for the aborted packet. To do this, the control logic would assert the select signal SELWRP, forcing the G multiplexer to select the output of the WPR register. Further, the control logic would assert the chip select signal and the write signal to the buffer memory to enable the buffer memory and tell it to write the data then existing on the data bus 46 into the memory pointed to by the current contents of the WPR, i.e., address location 1. The node processor, or DPC, will have loaded the status and length information on the data bus prior to or simultaneously with the chip select and write signals to the buffer memory. Step 5 also represents the process of incrementing the WRP pointer storage register by one. This is done in the same manner as described above with reference to FIG. 10. In the hypothetical example, the WPR register would be pointing to address location 2 at the completion of step 5 of FIG. 12. Step 6 of FIG. 12 is the final step in the aborted packet algorithm. This step involves writing a zero status bit into the predetermined bit in the memory location following the status and length information for the aborted packet. In the hypothetical example, this zero status bit would be written into memory address location 2. The manner in which this is done is identical to step 7 in the algorithm represented by FIG. 8.

PROTOCOL FOR LINKED AND NONLINKED PACKET TRANSMISSION

Figure 13:
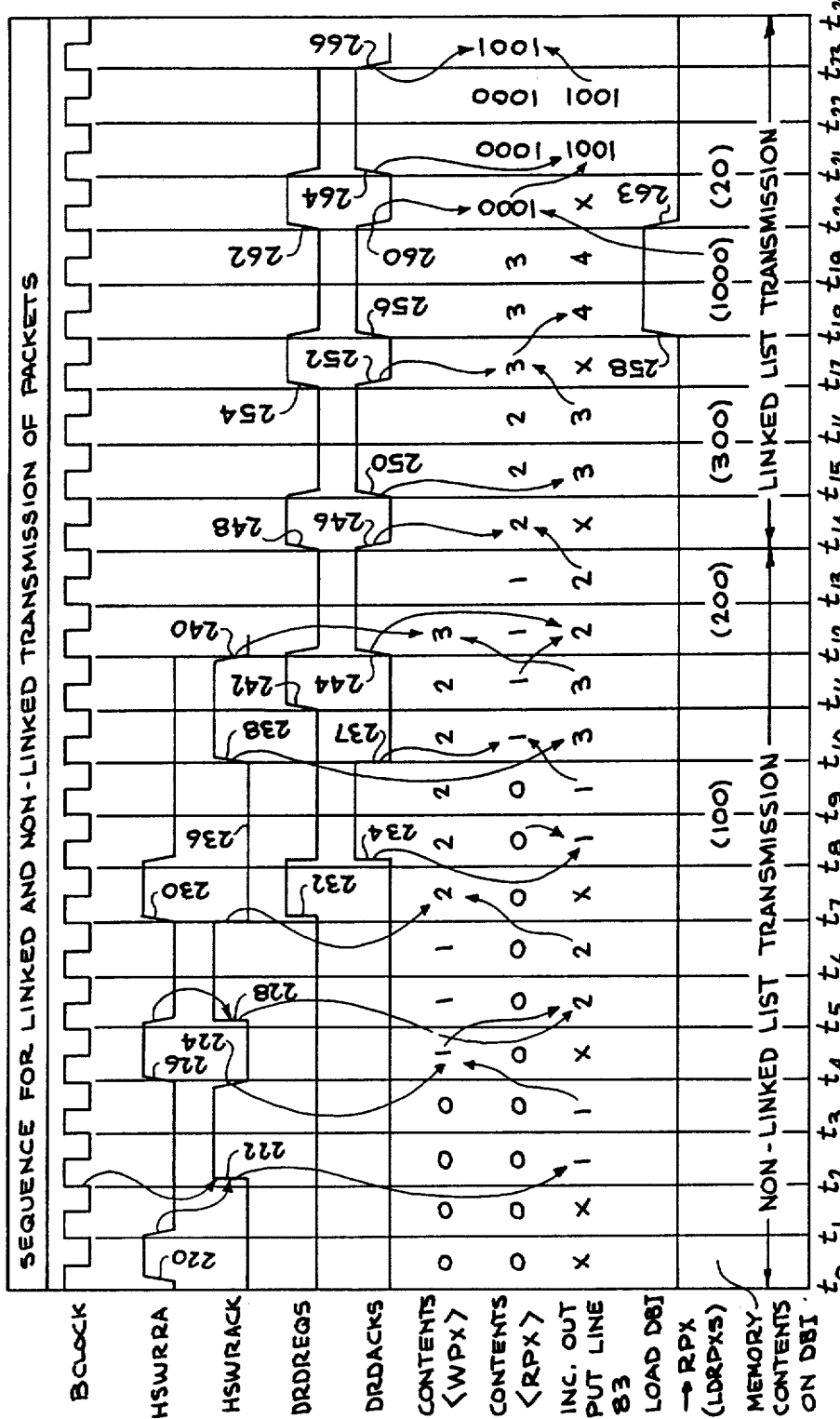
FIG. 13 is a timing diagram showing the process for transmitting both linked lists of packets and non-linked packets.

Referring to FIG. 13, there is shown a timing diagram for the sequence of events which occurs during both linked-list transmission and nonlinked-list transmission.

Nonlinked-list transmission occurs as follows. To load the buffer memory with the packet to be transmitted, the host system asserts a host system write request in the form of assertion of the signal HSWRRQ, shown at 220. This assertion is sensed by the priority arbitration logic 62 in FIG. 2 and acknowledged by assertion of the signal HSWRACK at 222. This acknowledgment signal is sent back to the host system via the status bus 68 in FIG. 2. A hypothetical example will be used to illustrate the operation of the system, as shown in FIG. 13. In this hypothetical, the contents of the WPX pointer storage register at the outset of the transmission is zero, as are the contents of the RPX pointer storage register.

When the host system write request is acknowledged at 222, the G multiplexer is ordered by the control logic to select the output of the WPX pointer storage register. This causes the zero stored in the WPX pointer storage register to be applied to the input of the incrementer 82. The incrementer then outputs a one on line 83. In the preferred embodiment, the host system write request acknowledge signal lasts for two clock cycles, i.e., between the times t2 and t4 in FIG. 13. In other embodiments, one clock cycle might be used, or more than two clock cycles might be used. The incrementer output line 83 stays constant at one, however, from the time of the transition 222 to the transition 224 at t4.

The transition 224 causes the control logic 125 in FIG. 4 to cause the D multiplexer in FIG. 4 to select its number 1 input, thereby loading the one at the incrementer output into the WPX pointer storage register. During the time from t2 to t4 in FIG. 13, the first word of the packet to be transmitted was loaded into the buffer memory at address location zero.

At time t4 the host system asserts another write request, as shown at 226. This causes an acknowledgment signal by the host system by assertion of the signal HSWRACK, as shown at 228. The transition at 228 causes the arbitration logic 62 to issue a select signal to the G multiplexer which selects the output of the WPX pointer storage register for connection to the address bus 40. This applies the current contents of WPX to the incrementer input, which then increments the one curre ly residing in the WPX register to a two, and outputs it on line 83. During the time from t5 to t7, the second word to be transmitted is loaded by the host system into the buffer memory 38 at address one via the data bus 46.

At time t7, the host system asserts another write request, as shown at 230. Simultaneously, the data path controller asserts a read request by activating the signal DRDREQS on bus 64 in FIG. 2. This assertion is shown at 232 in FIG. 13. At this point the control logic 125 in FIG. 4 blocks requests from the node processor or host and awards priority to the data path controller, because the data path controller always has the highest priority. Basically, the process that is occurring here is the host system is trying to fill up the transmit buffer with words from a packet that it wishes to transmit.

Figure 14:
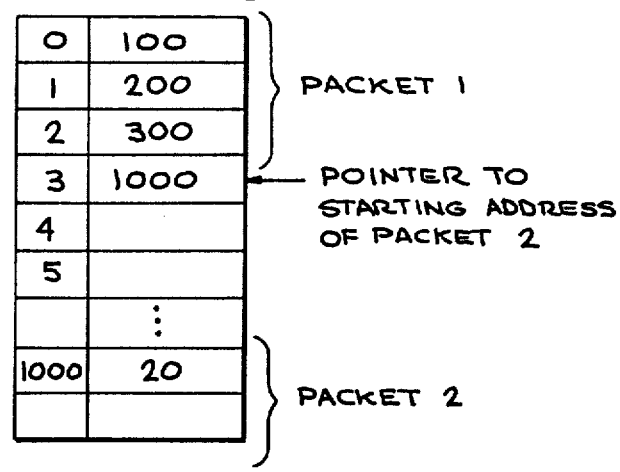
FIG. 14 is a diagram of the memory address locations and their contents used in the example of FIG. 13.

Substantially simultaneously, the data path controller is starting to empty words from the buffer memory and transmit them out on the medium. The award of priority to the data path controller is shown by the assertion of the data path controller read request acknowledge signal, DRDACKS, as shown at 234 in FIG. 13. The award of priority to the data path controller precludes sending an acknowledgment signal to the host system to acknowledge its write request shown at 230. This is shown by the absence of assertion of the acknowledge signal HSWRACK between times t8 and t9, as shown at 236. The assertion of the data path controller acknowledge signal, DRDACKS, at 234 causes the control logic to send a select signal to the G multiplexer, causing it to select the contents of the RPX pointer storage register for output on the address bus 40. This supplies the current contents of the RPX pointer storage register on address bus 40 at time t8 to the buffer memory 38. Thus a zero pointer address would be supplied to the buffer memory for the DPC read operation commencing at time t8 in the hypothetical example used here. Accordingly, the buffer memory would output the contents of the zero address location between times t8 and t10. FIG. 14 shows a hypothetical set of memory addresses and their contents. Accordingly, a 100 would be placed on the data bus in response to the DPC read request corresponding to the word written into the memory by the host system between times t2 and t4. Also the RPX value of zero would be applied to the input of the incrementer, which would then increment it and output a one on line 83 at time t8.

The deactivation of the DPC acknowledge signal at time t10 at 236 causes the C multiplexer in FIG. 4 to select its input coupled to the output of the incrementer for coupling to the data input of the RPX pointer storage register. This loads the one at the output of the incrementer into the RPX pointer storage register, thereby incrementing this pointer from zero to one.

Upon completion of servicing of the DPC read request at time t10, the arbitration logic 62 acknowledges the pending host system write request, asserted at time t7. This is done as shown at 238 in FIG. 13 by asserting the host system write acknowledge signal HSWRACK at time t10. The assertion at 238 causes the G multiplexer to once again select the contents of the WPX pointer storage register for output on the address bus. The incrementer then takes the current contents of the WPX pointer storage register at address two and increments it to address number three. When the host system write request service is completed at 240 and time t12, the signal HSWRACK is deactivated, which causes the control logic to order the D multiplexer to select its number 1 input coupled to the output of the incrementer, thereby loading the three at the output of the incrementer as the new incremented pointer address for the WPX pointer storage register.

At time t11, the data path controller asserts another read request, as shown at 242. This DPC read request is acknowledged at time t12 by the arbitration logic 62, as shown by the assertion of the signal DRDACKS at 244. The assertion at 244 causes the G multiplexer to again select the contents of the RPX pointer storage register for output on the address bus 40, thereby supplying the one currently stored as the RPX pointer to the input of the incrementer. The incrementer increments the pointer address one to pointer address two, and applies it to the output line 83. Upon completion of the DPC read service request at time t14 as shown at 246, the control logic causes the multiplexer in FIG. 4 to select its number 1 input coupled to the output of the incrementer, thereby loading the address two pointer value into the RPX pointer storage register. This completes the illustration of the nonlinked-list transmission of 5 words from the buffer memory. This example extends from time t0 to t14 in FIG. 13.

Linked-List Transmission Example

At time t14 the data path controller asserts another read request as shown at 248. This is acknowledged by the control logic 125 by asserting the signal DRDACKS at time t15, as shown at 250. As described earlier, the assertion of the DRDACKS signal at time t15 causes the current contents of the RPX pointer storage register, address two, to be applied to the input of the incrementer and incremented to a value of address three. To best understand the operation of the RAM buffer controller in the linked-list mode, reference is made to FIG. 14, which shows a hypothetical example of several memory locations having addresses 0–5 and showing the contents of these memory location. FIG. 13 shows the data on the data bus during read cycles on the line entitled "Memory Contents on DBI". The first read transfer from the buffer memory 38 occurs between times t8 and t10. At that time the RPX pointer address is zero, and the contents of the zero address, a 100 value, is placed on the DBI bus. The next read cycle occurs between times t12 and t14. At that time, the RPX pointer value is one, and the contents of address one are placed on the DBI bus. Thus, a 200 value is found on the DBI bus between times t12 and t14. The next read cycle occurs between times t15 and t17. At that time the RPX pointer is on address location two, so the data on the DBI bus represents a value 300. The deactivation of the signal DRDACKS at time t17 causes the C multiplexer in FIG. 4 to select its number 1 input, thereby loading the output of the incrementer, a value of three, into the RPX pointer storage register, as shown at 252 in FIG. 13. At time t17, the data path controller again asserts a read request, as shown at 254. This read request is acknowledged at 256 and time t18. As described before, this causes the RPX pointer to be selected for output by the G multiplexer on the address bus 40, thereby outputing an address of three to the buffer memory. This address value of three is incremented by the incrementer 82 and applied to the first input of the C multiplexer by the line 83.

Assume now that the contents of address location number three are a pointer to the starting address of a packet number 2. Assume also that address locations zero through two contain data words from a packet number 1. Address location three will contain a unique delimiter that indicates to the data path controller that its contents are a pointer address. When the data path controller detects this delimiter (not shown in FIG. 14), the data path controller asserts a signal LDRPXS at time t18, as shown at 258. This causes the current contents of the DBI bus to be loaded into the RPX register. As seen from FIG. 2, there are two signals of this nature, LDRPXS and LDRPXA. These two signals are used to control the loading of the RPXS and RPXA pointer storage registers in FIG. 5, respectively. Thus, upon deactivation of the signal DRDACKS at 260 and deactivation of the signal LDRPXS at 262, the control logic 125 causes the C multiplexer to switch such that the value on the DBI bus, a 1000 is loaded into the RPX pointer storage register.

At time t20, the DPC asserts another read request, as shown at 262. This read request is acknowledged by assertion of the signal DRDACKS at time t21 as shown at 264. The acknowledgment of the DPC read request causes the control logic to send a select signal to the G multiplexer causing it to select the RPX contents for output on the address bus 40. Thus, the current contents of the RPX pointer storage register, i.e., an address 1000, is output on the address bus 40, and the contents of the memory location 1000 are then output on the DBI bus. This is shown in FIG. 13 as the existence of a 20, the contents of memory location 1000, on the DBI bus between times t20 and t22.

The contents of memory location 1000 are not a pointer, but are the first word of packet number 2. Therefore, the data path controller does not activate the signal LDRPXS. The acknowledgment of the DPC read request at time t21 also applies the current contents of RPX to the incrementer input, thereby causing the incrementer to increment the 1000 address pointer to an address pointer having a value of 1001. Upon completion of the service of the DPC read request at time t23, the signal DRDACKS is deactivated, as shown at 266. This causes the C multiplexer to select its number 1 input, thereby loading the output of the incrementer, the value 1001, into the RPX pointer storage register. Processing or read requests then continue as described above. This completes the description of linked-list transmission protocol.

Figure 15:
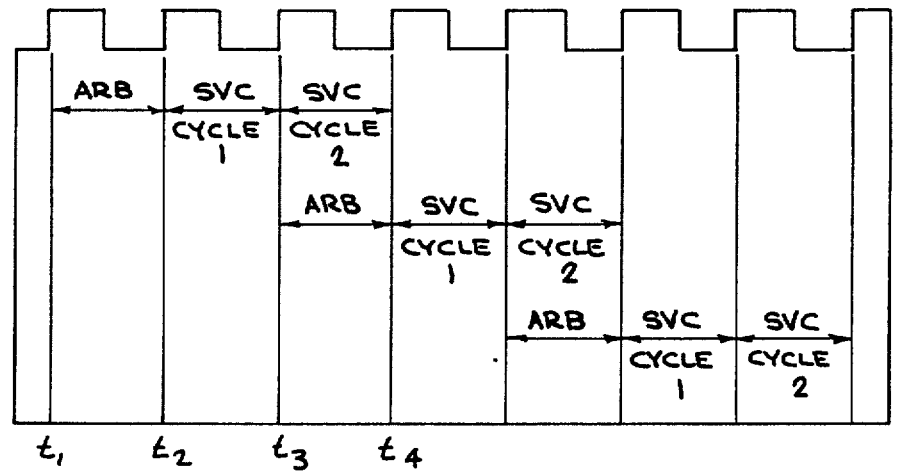
FIG. 15 is a timing diagram of the pipelined arbitration of service requests carried out by the invention.

Another feature of the invention which is useful is pipelined arbitration. Referring to FIG. 15 there is shown a conceptual diagram of the pipelined arbitration scheme of the invention. The basic idea is to overlap the arbitration cycle with the second service cycle of each two cycle transfer just preceding the service cycle. An example will clarify this. Assume at time t1, a read request comes in from the host system and from the node processor simultaneously. The arbitration logic decides the priority and selects the node processor read request for service starting at time t2 and extending for two cycles to time t4. The RPR pointer is selected, and its address remains constant for two cycles from t2 to t4. Meanwhile the host system read request remains pending, and a host system write request is asserted at time t2. A time t3, the arbitration logic will be caused by the control logic 125 to arbitrate between the host system read request and the host system write request. This arbitration will occur between times t3 and t4. The winning request will be decided and ready at time t4 which is the same time that the service for the winning request decided between times t1 and t2 ends. Thus service of the winning request from round two begins immediately upon completion of service of the winning request from round 1.

MULTI DATA PATH CONTROLLER SYSTEMS

There are some applications where it is useful to allow two systems with a need to access a RAM and which may or may not be running synchronously with each other to share a single RAM buffer controller. Where a single clock drives all the systems and is coupled to the RAM buffer controller, there is no problem. Such a system is illustrated in FIG. 1 where the single clock is derived from the incoming data stream on the medium 20 and the clock signal is applied to all units in the system so that all are running synchronously.

Figure 16:
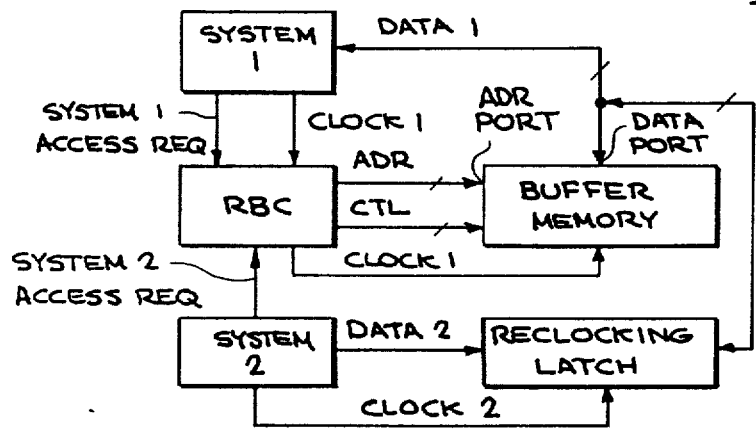
FIG. 16 is a diagram of an asynchronous system using two systems with DMA needs each having their own clock and which share a common RAM buffer controller which runs on the clock of only one system.

However, there are some applications where the two systems needing DMA access to the buffer memory whose address port is controlled by a single RAM buffer controller each have their own clock. Such an application is shown in FIG. 16. In FIG. 16, system 1 can be any system with DMA needs and its own clock, CLOCK 1, such as a host system, node processor, computer peripheral etc., and system 2 can be any other system with DMA needs and its own clock, CLOCK 2. The RAM buffer controller is coupled to only CLOCK 1, and it controls the address ports and supplies address signals and control signals, including CLOCK 1, to a buffer memory. System 1 is coupled to the data ports of the buffer memory by the data bus DATA 1. System 2 is coupled to the data ports of the buffer memory via its own data bus DATA 2, a reclocking latch and data bus DATA 1. CLOCK 2 is applied to the clock input of the reclocking latch such that when system 2 wishes to load data into or receive data from the buffer memory, the data is loaded in the reclocking latch in synchronization with the system 2 clock, even though the buffer memory is operating in synchronization with the system 1 clock. The purpose of the reclocking latch is to eliminate the timing differences between the DMA operations of systems 1 and 2.

Although the invention has been described in terms of the preferred embodiment and other embodiments described herein, those skilled in the art will appreciate many variations on the circuitry described herein which may be successfully used without departing from the true spirit and scope of the claims appended hereto. For example, the circuitry of FIGS. 4 and 5 could be replaced with a general purpose computer which is programmed to carry out the protocols described herein in FIG. 13 and FIGS. 8-12. All such modifications are intended to be included within the scope of the claims appended hereto.

What is claimed is:

1. An apparatus for controlling the address inputs of a memory, comprising:

first means for storing a plurality of address pointers;

second means coupled to said first means for selecting one of said address pointers and for outputting said selected address pointer to said memory;

third means coupled to said second means and to said first means for incrementing the selected address pointer and loading it back into said first means to replace the selected address pointer;

wherein said first means stores a write address pointer and read address pointer for receiving packets to be stored in said memory and a read address pointer and a write address pointer for transmit packets to be retrieved from said memory for transmision, said receive packets and transmit packets being received from and/or sent to said accessing devices;

further comprising an initialization bus coupled to said first means, and fourth means coupled to said initialization bus and said first means for receiving and storing starting address pointers on said initialization bus and said initialization bus for allowing independent setting of any of said address pointers to a selected address, and said fourth means also for causing said starting address pointers to be stored in said first means at predetermined times, wherein said first means includes a plurality of registers for storing said address pointers including a first register for storing a write pointer for receive packets and having an output coupled to said second means and a second register for storing a shadow write pointer for receive packets where said first and second registers have inputs and outputs, and further comprising first and second multiplexers having outputs coupled respectively to said inputs of said first and second registers, each said multiplexer having a plurality of inputs wherein one input of said first multiplexer is coupled to said third means for receiving the incremented value of said write pointer for receive packets when said second means selects the write pointer for receive packets for output to said memory and wherein the output of said second register is coupled to an input of each of said first and second multiplexers and wherein the output of said first register is coupled to an input of each of said first and second multiplexers.

2. The apparatus of claim 1, further comprising fifth means coupled to said initialization bus for receiving and storing end addresses for said receive and transmit packets in said memory and sixth means coupled to said fifth means and to said second means for comparing the receive and transmit address pointers to the said end addresses for said receive and transmit packets, respectively, and for generating an end signal indicating whether either of said receive and transmit address pointers is equal or not equal to said end addresses for said receive and transmit packets, respectively.

3. An apparatus as defined in claim 2 further comprising a multiplexer having its output coupled to a data input of said first means and having an input coupled to an output of said fourth means for storing said starting address pointers and an input coupled to said initialization bus and having a control input and further comprising control means coupled to said control input and to said sixth means for receiving said end signal and for determining when the selected read pointer or write pointer has become equal to said end address and for causing said multiplexer to select the output of said fourth means such that the proper starting address pointer for the FIFO corresponding to the selected read or write pointer may be stored in said first means as the new value for the selected read or write pointer address.

4. An apparatus as defined in claim 3 further comprising full/empty comparison means coupled to said first means for comparing said read and write pointers for receive packets and generating a first signal indicating whether said pointers are equal and for comparing said read and write pointers for said transmit packets and generating a second signal indicating whether said pointers are equal.

5. An apparatus as defined in claim 4 further comprising means coupled to said full/empty comparison means for receiving said first and second signals and for determining which of said read and write pointers was incremented so as to cause the compared pointers to become equal for making a determination in the case of said first signal indicating the status of the receive FIFO whether that FIFO is full or empty and for making a determination in the case of said second signal indicating the status of the transmit FIFO whether that FIFO is full or empty.

6. An apparatus as defined in claim 2 wherein said fifth means includes means for allowing the end pointer addresses to be initialized or changed to any desired address within the address space of said memory.

7. An apparatus as defined in claim 3 further comprising a random access memory address register coupled to said initialization bus and wherein said control means ignores said end signal when said second means selects the output of said random access memory address register for output to said memory.

8. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
wherein said memory includes a first stack and a second stack and said third means is also for decrementing the selected address pointer, further comprising means coupled to said first means for independently initializing separate write and read pointers for said first stack and for initializing separate write and read pointers for said second stack and for controlling said third means to manage the incrementing and decrementing of said write and read pointers such that a last-in, first-out memory access operation in said memory may be performed, wherein said first means includes a plurality of registers for storing said address pointers including a first register for storing a write pointer for receive packets and having an output coupled to said second means and a second register for storing a shadow write pointer for receive packets where said first and second registers have inputs and outputs, and further comprising first and second multiplexers having outputs coupled respectively to said inputs of said first and second registers, each said multiplexer having a plurality of inputs wherein one input of said first multiplexer is coupled to said third means for receiving the incremented value of said write pointer for receive packets when said second means selects the write pointer for receive packets for output to said memory and wherein the output of said second register is coupled to an input of each of said first and second multiplexers and wherein the output of said first register is coupled to an input of each of said first and second multiplexers.

9. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
wherein said first means stores a write address pointer and read address pointer for receiving packets to be stored in said memory and at least two read address pointers and a write address pointer for transmit packets to be retrieved from said memory for transmission; and
wherein said first means includes a plurality of registers, each said register for storing one of said address pointers, one of said registers for storing the read address pointer for transmit packets, and further comprising linked list means, connected to said first means, for receiving and storing at least two separate and independent link pointers for at least two separate and independent linked lists as said at least two read address pointers for said transmit packets.

10. An apparatus as defined in claim 9 further comprising an initialization bus for carrying initial addresses for said pointers for transmit packets and a DBI bus for carrying linking addresses for storage in the registers storing the read pointer addresses for transmit packets and wherein said linked list means includes input multiplexer means having outputs coupled to the data inputs of said registers for storing read addresses for transmit packets and having inputs coupled to said initialization bus and having an input coupled to said DBI bus and having inputs coupled to said third means and having a control input, and further comprising control means coupled to said control input for causing said multiplexer to select an input coupled to said DBI bus for coupling to an output coupled to a read address pointer storage register for transmit packets during transmission of a packet organized as a first linked list in said memory such that linking addresses from said DBI bus will be loaded in the register storing the read pointer for transmit packets and, at other times, for causing said multiplexer to select an input coupled to said DBI bus for coupling to a read address pointer storage register for transmit packets during transmisssion of a packet organized as a second linked list independent of said first linked list.

11. An apparatus as defined in claim 10 further comprising a starting address register for storage a new link address pointing to the location in memory of a predetermined packet and having an input coupled to said initialization bus and having an output coupled at least to an input of the input multiplexer having its output coupled to the input of the register storing the read pointer for the transmit packets, said control means for receiving a signal INICLBN indicating that said predetermined packet should be sent, said control means for causing said input multiplexer to select the input coupled to the output of said starting address register when said INICLBN signal is received.

12. An apparatus as defined in claim 11 further comprising an end address register having an input and a second input multiplexer having an input coupled to the output of said register for storing the read address pointer for the transmit packets and having its output coupled to said input of said end address register and having a control input, and wherein said control means is also coupled to said control input of said second input multiplexer and wherein said control means is also for simultaneously causing said second input multiplexer to select said input coupled to the output of said register for storing the read address pointer for transmit packets simultaneously with the selection by said input multiplexer of its input coupled to the output of said starting address register upon receiving said INICLBN signal such that the link address is loaded in said register which is for storing the read pointer for transmit packets simultaneously with the loading of the current read pointer for transmit packets into the end address register.

13. An apparatus as defined in claim 9, wherein said first means includes a starting address register and an ending address register, said starting address register being coupled to an input of a first said read address pointer storage register for transmit packets, and said ending address register being coupled to an output of said first read address pointer storage register, and further comprising means for, causing the read address pointer stored in said read address pointer storage register to be stored in said ending address storage register and for causing an address stored in said starting address register to be stored in said first read address pointer storage register for transmit packets at a selected time.

14. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
wherein said first means comprises a plurality of registers for storing said address pointers and further comprises a plurality of multiplexers each having an output, with one said multiplexer output coupled to a data input of a respective one of said plurality of registers, and each said multiplexer having a plurality of inputs including first inputs and second inputs, and further comprising an initialization bus coupled to said first inputs and wherein said third means is coupled to said second inputs, where said plurality of registers includes a first register for storing a write pointer for receive packets and having an output coupled to said second means and a second register for storing a shadow write pointer for receive packets, where said first and second registers have inputs and outputs, and wherein said plurality of multiplexers includes first and second multiplexers having outputs coupled, respectively, to said inputs of said first and second registers, each of said first and second multiplexers having a plurality of inputs, wherein one input of said first multiplexer is coupled to said third means for receiving the incremented value of said write pointer for received packets for output to said memory, and wherein the output of said second register is coupled to an input of each of said first and second multiplexers and wherein the output of said first register is coupled to an input of said first and second multiplexers.

15. An apparatus as defined in claim 14 wherein one of said registers is a random access memory address register.

16. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
wherein said first means includes a plurality of registers for storing said address pointers including a first register for storing a write pointer for receive packets and having an output coupled to said second means and a second register for storing a shadow write pointer for receive packets where said first and second registers have inputs and outputs, and further comprising first and second multiplexers having outputs coupled respectively to said inputs of said first and second registers, each said multiplexer having a plurality of inputs wherein one input of said first multiplexer is coupled to said third means for receiving the incrmented value of said write pointer for receive packets when said second means selects the write pointer for receive packets for output to said memory and wherein the output of said second register is coupled to an input of each of said first and second multiplexers and wherein the output of said first register is coupled to an input of each of said first and second multiplexers.

17. An apparatus as defined in claim 16 wherein said first and second multiplexers also have control inputs and further comprising control means coupled to said control inputs and further comprising data path controller means coupled to said control means, said control means having a first input for receiving a FSHRCVP signal from said data path controller means indicating a packet or portion thereof received from one of said accessing devices is to be flushed and having a second input for receiving a BRCVPKT signal from said data path controller means indicating packet reception is beginning and having a third input for receiving DWRREQ signal from said data path controller means indicating that packet reception is occurring, said control means for causing said second multiplexer to select the input coupled to the output of said first register and for causing said first multiplexer to select the input coupled to said third means to cause said first register to load the write pointer for receive packets as incremented by said third means upon receiving said BRCVPKT signal and for causing said first multiplexer to continue to select said input coupled to said third means upon receiving said DWRREQ signal and for causing said first multiplexer to select the input coupled to the output of said second register and thereafter to cause said first multiplexer to select said input coupled to said third means upon receiving said FSHRCVP signal.

18. An apparatus as defined in claim 16 wherein said first and second multiplexers also have control inputs and further comprising control means coupled to said control inputs, and further comprising data path controller means coupled to said control means, said control means having a first input for receiving a FSHRCVP signal from said data path controller means indicating a packet or portion thereof received from one of said accessing devices is to flushed, and having a second input for receiving a BRCVPKT signal from said data path controller means indicating packet reception is beginning, and having a third input for receiving a DWRREQ signal from said data path controller means indicating that packet reception is occurring, and having a fourth input for receiving an ERCVPKT signal from said data path controller means indicating a packet has been successfully received, said control means for causing said second multiplexer to select the input coupled to the output of said first register to cause the then existing write pointer for receive packets to be saved in the second register and for causing said first multiplexer to select the input coupled to said third means to cause said first register to load the write pointer for receive packets as incremented by said third means upon receiving said BRCVPKT signal and for causing said first multiplexer to continue to select said input coupled to said third means upon receiving said DWRREQ signal such that the write pointer for receive packets is incremented on every clock cycle during packet reception and, upon receiving said ERCVPKT signal, for causing said first multiplexer to select the input coupled to the output of said second register and for causing said second multiplexer to select the input coupled to the output of said first register such that the contents of these two registers are exchanged, and for causing said second means to select the output of said first register for application to the address inputs of said memory, with said data path controller means also coupled to the data inputs of said memory for keeping track of the length of the received packet and its status and for writing this data into the location in memory pointed to by the current contents of said first register, said control means also for causing said first multiplexer to select the input coupled to the output of said second register after said status and length data is written so as to cause said first register to load the contents of said second register to restore the write pointer for receive packets to its state as it existed at the time of receiving said ERCVPKT signal, said data path controller means for writing predetermined bit in the memory location addressed by the contents of said first register and for subsequently causing said first multiplexer to select the input coupled to the output of said first register until the next BRCVPKT signal is received.

19. An apparatus as defined in claim 16 wherein said first and second multiplexers also have control inputs and further comprising control means coupled to said control inputs, and further comprising data path controller means coupled to said control means, said control means having a first input for receiving a FSHRCVP signal from said data path controller means indicating a packet or portion thereof received from one of said accessing devices is to be flushed, and having a second input for receiving a BRCVPKT signal from said data path controller means indicating packet reception is beginning, and having a third input for receiving a DWRREQ signal from said data path controller means indicating that packet reception is occurring, and having a fourth input for receiving an RCVABRT signal from said data path controller means indicating a packet that has been received or partially received is to be aborted but its status and length information is to be recorded, said control means for causing said second multiplexer to select the input coupled to the output of said first register to cause the then existing write pointer for receive packets to be saved in the second register and for causing said first multiplexer to select the input coupled to said third means to cause said first register to load the write pointer for receive packets as incremented by said third means upon receiving said BRCVPKT signal, and for causing said first multiplexer to continue to select said input coupled to said third means upon receiving said DWRREQ signal such that the write pointer for receive packets is incrmented on every clock cycle during packet reception and, upon receiving said RCVABRT signal, for causing said first multiplexer to select the input coupled to the output of said second register such that the contents of the second register is loaded in said first register, and for causing said second means to select the output of said first register for application to the address inputs of said memory, with said data path controller means also coupled to the data inputs of said memory for keeping track of the length of the received packet and its status and for writing this data into the location in memory pointed to by the current contents of said first register, said control means also for causing said first multiplexer to select the input coupled to the output of said third means after said status and length data is written so as to cause said first register to reload the current write pointer for receive packets as incremented by said third means, said data path controller for writing a predetermined bit in the memory location addressed by the contents of said first register after its contents have been incremented and for subsequently causing said first multiplexer to select the input coupled to the output of said first register until the next BRCVPKT signal is received.

20. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
further comprising arbitration means coupled to said second means and having a plurality of service request signal inputs from said accessing devices for receiving signals indicating that a particular pointer is desired to be selected, said arbitration means for arbitrating said request signals and selecting the currently asserted request with the highest priority; wherein said first means includes a plurality of registers for storing said address pointers including a first register for storing a write pointer for receive packets and having an output coupled to said second means and a second register for storing a shadow write pointer for receive packets where said first and second registers have inputs and outputs, and further comprising first and second multiplexers having outputs coupled respectively to said inputs of said first and second registers, each said multiplexer having a plurality of inputs wherein one input of said first multiplexer is coupled to said third means for receiving the incremented value of said write pointer for receive packets when said second means selects the write pointer for receive packets for output to said memory and wherein the output of said second register is coupled to an input of each of said first and second multiplexers and wherein the output of said first register is coupled to an input of each of said first and second multiplexers.

21. An apparatus for controlling the address inputs of a memory, comprising:
first means for storing plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
further comprising arbitration means coupled to said second means and having a plurality of service request signal inputs from said accessing devices for receiving signals indicating that a particular pointer is desired to be selected, said arbitration means for arbitrating said request signals and selecting the currently asserted request with the highest priority;

wherein said first means includes a plurality of registers for storing said address pointers including a first register for storing a write pointer for receive packets and having an output coupled to said second means and a second register for storing a shadow write pointer for receive packets where said first and second registers have inputs and outputs, and further comprising first and second multiplexers having outputs coupled respectively to said inputs of said first and second registers, each said multiplexer having a plurality of inputs wherein one input of said first multiplexer is coupled to said third means for receiving the incremented value of said write pointer for receive packets when said second means selects the write pointer for receive packets for output to said memory and wherein the output of said second register is coupled to an input of each of said first and second multiplexers and wherein the output of said first register is coupled to an input of each of said first and second multiplexers; and further comprising a clock input of receiving a clock signal and wherein said second means has a control input and wherein said first means comprises a plurality of registers for storing predetermined ones of said pointer addresses, each register having an input and an output and a clock input for receiving said clock signal for causing the data at said input to be latched into said register and to be available for output on said output, and further comprising a plurality of multiplexers each having its output coupled to a said input of one of said registers and each having at least one input coupled to the output of the register to which the multiplexer has its output coupled, and wherein said third means has an output carrying the incremented value of the pointer selected by said second means, said output of said third means coupled to another input of each said multiplexer, and each said multiplexer having a control input, and further comprising a control means coupled to said control inputs of said multiplexers and to said arbitration means and to a control input of said second means for sensing which request signal has received priority and for causing said second means to select the appropriate one of said pointers in accordance with the result of the arbitration and for causing said multiplexer coupled to the input of the reigster whose pointer contents have been selected for output by said second means to select its input coupled to the output of said third means for a first clock cycle and for causing said multiplexer input coupled to the selected register to select the multiplexer input coupled to the output of the selected register during a second clock cycle.

22. The apparatus of claim 21, wherein said memory has address inputs and said control means also causes said arbitration means to perform its next arbitration for said incremented pointer to be selected during said second clock cycle during which the currently selected pointer is selected for output to said address inputs of said memory.

23. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
wherein said first means includes a plurality of registers for storing said pointers and further comprises an initialization bus coupled to an input of each register and wherein one of said registers is for storing a random access address pointer which can be set initially by said data on said initialization bus and will be incremented by said third means when said random access pointer is selected for output by said second means;
where said plurality of registers includes a first register for storing a write pointer for receive packets and having an output coupled to said second means and a second register for storing a shadow write pointer for receive packets, where said first and second registers have inputs and outputs, and further comprising first and second multiplexers having outputs coupled, respectively, to said inputs of said first and second registers, each of said first and second multiplexers having a plurality of inputs, wherein one input of said first multiplexer is coupled to said third means for receiving the incremented value of said write pointer for receive packets for output to said memory, and wherein the output of said second register is coupled to an input of each of said first and second multiplexers and wherein the output of said first register is coupled to an input of said first and second multiplexers.

24. An apparatus as defined in claim 23 further comprising arbitration means having a plurality of inputs for coupling to conductors carrying request signals and coupled to said second means for arbitrating any simultaneously asserted requests from said accessing devices and selecting the highest priority request and for causing said second means to provide said random access pointer register output as output to said memory.

25. An apparatus as defined in claim 24 further comprising means having an instruction bus input and coupled to said second means for decoding an instruction received at said instruction bus input.

26. An apparatus as defined in claim 23 further comprising instruction decoder means having an instruction bus input and coupled to said second means for decoding an instruction received at said instruction bus input.

27. An apparatus for controlling the address inputs of a memory, comprising:
first means for storing a plurality of address pointers;
second means coupled to said first means for selecting one of said address pointers and for outputting said selected address pointer to said memory;
third means coupled to said second means and to said first means for incrementing the selected address pointer and loading it back into said first means to replace the selected address pointer;
wherein said first means includes a plurality of registers for storing said pointers and further comprises an initialization bus coupled to an input of each register and wherein one of said registers is for storing a random access address pointer which can be set initially by said data on said initialization bus and will be incremented by said third means when said random access pointer is selected for output by said second means;

further comprising instruction decoder means having an instruction bus input and coupled to said second means for decoding an instruction received at said instruction bus input; and wherein said instruction decoder means is also coupled to said third means for stopping the third means from incrementing the selected pointer when a predetermined instruction is received.

28. An apparatus for controlling the address inputs of a memory, comprising:

first means for storing a plurality of address pointers;

second means coupled to said first means for selecting one of said address pointers and for outputting said selected address pointer to said memory;

third means coupled to said second means and to said first means for incrementing the selected address pointer and loading it back into said first means to replace the selected address pointer;

further comprising an initialization bus and wherein said first means comprises a plurality of registers each having an input and further comprises a plurality of multiplexers, each said multiplexer having an output coupled to a respective one of said register inputs, each said multiplexer also having an input coupled to said third means for receiving the incremented value of the selected pointer and each said multiplexer also having an input coupled to said initialization bus;

where said plurality of registers includes a first register for storing a write pointer for receive packets and having an output coupled to said second means and a second register for storing a shadow write pointer for receive packets, where said first and second registers have inputs and outputs, and wherein said plurality of multiplexers includes first and second multiplexers having outputs coupled, respectively, to said inputs of said first and second registers, each of said first and second multiplexers having a plurality of inputs, wherein one input of said first multiplexer is coupled to said third means for receiving the incremented value of said write pointer for receive packets for output to said memory, and wherein the output of said second register is coupled to an input of each of said first and second multiplexers and wherein the output of said first register is coupled to an input of said first and second multiplexers.

29. An apparatus for controlling the address inputs of a memory, comprising:

first means for storing a plurality of address pointers;

second means coupled to said first means for selecting one of said address pointers and for outputting said selected address pointer to said memory;

third means coupled to said second means and to said first means for incrementing the selected address pointer and loading it back into said first means to replace the selected address pointer;

further comprising an initialization bus and wherein said first means comprises a plurality of registers each having an input and further comprises a plurality of input multiplexers, each said multiplexer having an output coupled to a respective one of said register inputs, and further comprising a source multiplexer having an input coupled to said initialization bus and having an input coupled to said third means and having an output, each said input multiplexer having an input coupled to said output of said source multiplexer;

where said plurality of registers includes a first register for storing a write pointer for receive packets and having an output coupled to said second means and a second register for storing a shadow write pointer for receive packets, where said first and second registers have inputs and outputs, and wherein said plurality of multiplexers includes first and second multiplexers having outputs coupled, respectively, to said inputs of said first and second registers, each of said first and second multiplexers having a plurality of inputs, wherein one input of said first multiplexer is coupled to said third means for receiving the incremented value of said write pointer for receive packets for output to said memory, and wherein the output of said second register is coupled to an input of each of said first and second multiplexers and wherein the output of said first register is coupled to an input of said first and second multiplexers.

30. An apparatus for generating address pointers at an output for coupling to an address port of a memory for controlling data operations of said memory comprising:

a clock means for periodically generating a load signal;

a first register means having an input and having a load input coupled to said clock means for storing the address at said input upon each occurrence of said load signal and having an output, said register means for storing a read pointer for a transmit FIFO;

a second register means having an input and having a load input coupled to said clock means for storing the address at said input upon each occurrence of said load signal and having an output, said register means for storing a write pointer for said transmit FIFO;

a third register means having an input and having a load input coupled to said clock means for storing the address at said input upon each occurrence of said load signal and having an output, said register means for storing a read pointer for a receive FIFO;

a fourth register means having an input and having a load input coupled to said clock means for storing the address at said input upon each occurrence of said load signal and having an output, said register means for storing a write pointer for said receive FIFO;

an output multiplexer having inputs coupled to said outputs of said first, second, third and fourth register means and having an output and having a control input for receiving a signal controlling which of said inputs is coupled to said output;

first through fourth input multiplexers for said first through fourth register means, respectively, each input multiplexer having an output coupled to said input of an associated register means and each input multiplexer having first and second inputs and having a control input for rececivng a signal controlling which of said inputs is coupled to said outputs;

an incrementing means having an input coupled to the output of said output multiplexer and having an output coupled to each first input of each said input multiplexer, for incrementing the address pointer at the output of said output multiplexer and for supplying the incremented result to said first inputs of said first through fourth input multiplexers;

an initialization bus coupled to each second input of said input multiplexers for allowing any of said registers to be loaded with an address placed on said initialization bus;

control means having an instruction port and having output signal lines coupled to said control inputs for said input multiplexers to cause any selected one of said input multiplexers to select the selected input multiplexers second input for coupling to said output of said selected input multiplexer when a predetermined instruction arrives at said instruction port; and arbitration means having a plurality of memory access request inputs and having a plurality of control signal lines coupled to said control inputs of said input multiplexers and to said control input of said output multiplexer for arbitrating simulataneous memory access requests with each said request associated with one of said register means, for selecting the highest priority current memory access request and for activating predetermined control signal lines to cause said output multiplexer to select the output of the register means associated with the current highest priority memory access request selected by said arbitration means for output by said output multiplexer and for causing the input multiplexer coupled to the associated register means to select the input coupled to said incrementing means such that the current address in the selected register means will be incremented and the new value will be loaded on the next clock cycle.

31. An apparatus as defined in claim 30 further comprising means coupled to said initialization bus and to said output of said output multiplexer and having a control output for storing an end address for each of said transmit FIFO and said receive FIFO and for comparing the address of the currently selected FIFO to the appropriate one of the end addresses and for generating a signal indicating whether or not the end address has been equalled.

32. An apparatus as defined in claim 31 further comprising random access memory means coupled to said output multiplexer and said incrementing means and to said initialization bus and to said control means, said random access memory means for storing any address on said initialization bus and to be output at the output of said output multiplexer upon receipt of a predetermined instruction at said instruction port of said control means and for storing on each load signal either an incremented or a not incremented version of the address stored therein at the next previous load signal and for re-outputting the address stored upon each occurrence of said load signal depending upon the instruction received.

33. The apparatus of claim 30 further comprising a data bus and a fifth register means coupled to said output multiplexer and selectively coupled through a fifth input multiplexer to said data bus for storing a second read pointer for said transmit FIFO such that two linked lists may be stored in and transmitted from said transmit FIFO.

34. The apparatus of claim 30 further comprising first and second start address registers coupled to said initialization bus for storing first and second start addresses for said transmit and said receive FIFO's, respectively, and having first and second outputs, respectively, coupled to inputs of said first, second, third and fourth registers.

35. The apparatus of claim 30 further comprising a shadow write pointer register means for storing predetermined data at predetermined times and having an output coupled to an input of said fourth multiplexer and having a load input coupled to said clock means and having an input which is coupled to the output of said fourth register means, and further comprising a fifth multiplexer means for selectively coupling said shadow write pointer register means to said fourth register means and having a control input coupled to said control means and having a hold input coupled to said shadow write pointer register means output, and wherein said control means is also for generating signals at predetermined times to cause said fourth and fifth multiplexers to switch states so as to cause said fourth register and said shadow write pointer rigister to swap their contents.

36. A method of operating a RAM buffer controller for generating addresses for a memory, said RAM buffer controller being coupled to an output of a data path controller and including a first register, a second register, an incrementer and an output gate for gating the output of the first register to the address inputs of said memory, comprising the steps of:

storing an address in said first register;

upon receipt of a first signal from said data path controller and after storing said address, as a first storing step storing the contents of said first register in said second register and incrementing the contents of said first register;

upon receipt of a second signal from said data path controller after said first storing step, holding the contents of said second register constant while incrementing the contents of said first register once for every access to said memory;

upon receipt of a third signal from said data path controller after receipt of said second signal, simultaneously causing the contents of said first and second registers to be exchanged;

after said exchanging step, as a first gating step gating the output of said first register to said address inputs and writing data into the location in memory addressed by the contents of said first register;

after said first gating and writing step, as a second storing step causing the contents of said second register to be stored in said first register;

after said second storing step, as a second gating step gating the output of said first register to said address inputs of said memory and writing a predetermined bit at a predetermined bit location within the memory location addressed by the contents of said first register with predetermined data; and after said second gating step, holding the contents of said first register constant.

37. A method of operating a RAM buffer controller for generating addresses for a memory, said RAM buffer controller being coupled to an output of a data path controller and including a first register, a second register, an incrementer and an output gate for gating the output of the first register to the address inputs of said memory, comprising the steps of:

storing a starting address defining the starting address for storing information pertaining to the status and length of a data block comprising sufficient data to require storage in a plurality of memory locations in said memory in said first register;

upon receipt of a first signal from said data path controller after storing said address, storing the starting address stored in said first register in said second register and incrementing the contents of said first register to create a pointer address in said first register which is the next successive address after said starting address in said memory;
upon receipt of a second signal from said data path controller after storing said starting address in said second register, holding the contents of said second register constant while incrementing the contents of said first register once for every access to said memory and storing data from said data block in said memory at said successive addresses in said memory;
upon receipt of a third signal from said data path controller after storing all said data from said data block in successive addresses in said memory, causing the starting address stored in said second register to be stored in said first register; and
storing status and length information pertaining to said data block at said starting address in said memory pointed to by the contents of said first register.

38. A method of operating a RAM buffer controller for generating addresses for a memory, said RAM buffer controller being coupled to an output of a data path controller and including a first register, a second register, an incrementer and an output gate for gating the output of the first register to the address inputs of said memory, comprising the steps of:
storing an address in said first register;
upon receipt of a first signal from said data path controller after storing said address, storing the contents of said first register in said second register and incrementing the contents of said first register;
upon receit of a second signal from said data path controller after storing said first register contents, holding the contents of said second register constant while incrementing the contents of said first register once for every access to said memory;
upon receipt of a third signal from said data path controller after said holding step, causing the contents of said second register to be stored in said first register;
after storing said second register contents, as a first gating step gating the output of said first register through to said address inputs and writing predetermined data in a location in memory addressed by the contents of said first register;
after said first gating step, incrementing the contents of said first register;
after said incrementing step, as a second gating step gating the output of said first register through to said address inputs and writing a predetermined data bit into another memory location addressed by the contents of said first register; and
after said second gating step, preventing the incrementing of the contents of said first register in preparation for the next memory access.

39. A method of operating a RAM buffer controller controlling the address inputs of a memory, said RAM buffer controller being coupled to an output of a data path controller and having a first register for storing write pointer addresses for use in storing received packets from a network in said memory and having a second register for storing a shadow write pointer and having first and second multiplexers controlling the data which is input respectively to said first register and to said second register and having an incrementer having an input and having an output coupled to an input of said first multiplexer where said first multiplexer also has inputs coupled to the output of said first register and to the output of said second register and where said second multiplexer has inputs coupled to the output of said first register and to the output of said second register and having control logic with a plurality of input signal lines and a plurality of output control lines to control the operation of said first and second multiplexers by means of a control program where each of said first and second multiplexers has a clock input coupled to a clock generating load signals and having an output multiplexer with a plurality of inputs including an input coupled to the output of said first register and with an output coupled to the input of said incrementer comprising the steps of:
generating signals by said control logic according to said control program upon receipt of a first signal from said data path controller to cause said second multiplexer to select its input coupled to the output of said first register and to cause the contents of said first register to be stored in said second register and thereafter generatng signals according to said control program to cause said second multiplexer to select its input coupled to the output of said second register and generating control signals according to said control program to cause said first multiplexer to select its input coupled to said incrementer and thereafter generating signals according to said control program causing said first multiplexer to select its input coupled to the output of said first register;
generating signals by said control logic according to said control program upon receipt of a second signal from said data path controller to cause said output multiplexer to select the input coupled to the output of said first register once during every memory cycle and to cause said first multiplexer to again select its input coupled to said incrementer on every memory access cycle and thereafter to hold the contents of said first register constant by selecting the input coupled to the output of said second register between memory cycles, and generating signals to cause said second multiplexer to select its input coupled to the output of said second register while said first multiplexer is selecting its input coupled to said incrementer;
generating signals by said control logic according to said control program upon receipt of a third signal from said data path controller to cause said second multiplexer to select its input coupled to the output of said first register and to cause the contents of said first register to be stored in said second register and to cause the contents of said second register to thereafter be held constant for a predetermined period and simultaneously with the loading of the contents of said first register into said second register to cause said first multiplexer to select its input coupled to the output of said second register and to cause the contents of said second register to be stored in said first register and thereafter to cause the contents of said first register to be held constant for another predetermined period;
generating signals according to said control program to cause said output multiplexer to select the input coupled to the output of said first register and writing status and length information into the memory location in said memory addressed by the contents of said first register;

generating signals according to said control program cuasing said first multiplexer to select its input coupled to the output of said second register so that the contents of said second register will be loaded into said first register and to cause the contents of said first register to be held constant;

writing a predetermined bit into the memory location addressed by the contents of said first register; and generating signals according to said control program causing said first multiplexer to select its input coupled to the output of said first register to hold the contents of said first register constant.

40. A method of operating a RAM buffer controller controlling the address input of a memory, said RAM buffer controller being coupled to an output of a data path controller, and having a first register for storing write pointer addresses for use in storing received data in said memory, and having a second register for storing a shadow write pointer, and having first and second multiplexers controlling the data which is input respectively to said first register and to said second register, and having an incrementer having an input and having an output coupled to an input of said first multiplexer and wherein said first multiplexer also has input coupled to the output of said first register and to the output of said second register, and wherein said second multiplexer has inputs coupled to the output of said first register and to the output of said second register, and having control logic with a plurality of input signal lines and a plurality of output control lines to control the operation of said first and second multiplexers by means of a control program where each of said first and second multiplexers has a clock input coupled to a clock, said clock for generating load signals, and having an output multiplexer with a plurality of inputs including an input coupled to the output of said first register and an output coupled to the input of said incrementer, comprising the steps of:

generating signals by said control logic according to said control program upon receipt of a first signal from said data path controller to cause said second multiplexer to select its input coupled to the output of said first register and to cause the contents of said first register to be stored in said second register, and, thereafter, generating signals according to said control program to cause said second multiplexer to select its input coupled to the output of said second register, and generating control signals according to said control program to cause said first multiplexer to select its input coupled to said incrementer, and, thereafter, generating signals according to said control program causing said first multiplexer to select its input coupled to the output of said first register;

generating signals by said control logic according to said control program upon receipt of a second signal from said data path controller to cause said output multiplexer to select the input coupled to the output of said first register once during every memory cycle and to cause said first multiplexer to again select its input coupled to said incrementer on every memory access cycle, and, thereafter, to hold the contents of said first register constant by selecting the input coupled to the output of said first register between memory cycles, and generating signals to cause this second multiplexer to select its input coupled to the output of said second register while said first multiplexer is selecting its input coupled to said incrementer;

generating signals by said control logic according to said control program upon receipt of a third signal from said data path controller to cause said first multiplexer to select its input coupled to the output of said second register and to cause the contents of said second register to be stored in said first register, and, thereafter, to cause the contents of said first register to be held constant for a predetermined period.

* * * * *